(12) United States Patent
Kahn et al.

(10) Patent No.: US 6,445,476 B1
(45) Date of Patent: Sep. 3, 2002

(54) TRANSMISSION AND RECEPTION OF DUOBINARY MULTILEVEL PULSE-AMPLITUDE-MODULATED OPTICAL SIGNALS USING SUBSEQUENCE-BASED ENCODER

(75) Inventors: Joseph Mardell Kahn, San Carlos; Keangpo Ho, San Jose, both of CA (US)

(73) Assignee: StrataLight Communications, Inc., Campbell, CA (US)

( * ) Notice: Subject to any disclaimer, the term of this patent is extended or adjusted under 35 U.S.C. 154(b) by 54 days.

(21) Appl. No.: 09/772,772

(22) Filed: Jan. 29, 2001

(51) Int. Cl.$^7$ .............................................. H04B 10/04
(52) U.S. Cl. ................. 359/184; 359/180; 359/181; 359/182; 359/183; 359/185; 359/188; 359/154; 359/158; 359/245; 375/260; 375/353; 375/289; 375/296; 375/286; 375/288; 375/239; 385/2; 385/3
(58) Field of Search ................. 359/184, 185, 359/180, 181, 182, 183, 154, 245, 158; 375/260, 353, 291, 286, 239, 288, 289, 296; 385/2, 3

(56) References Cited

U.S. PATENT DOCUMENTS

| | | | |
|---|---|---|---|
| 5,008,957 A | 4/1991 | Kiyono | 455/618 |
| 5,408,500 A * | 4/1995 | Ginzburg et al. | 375/288 |
| 5,510,919 A | 4/1996 | Wedding | 359/115 |
| 5,543,952 A | 8/1996 | Yonenaga et al. | 359/181 |
| 5,867,534 A | 2/1999 | Price et al. | 375/286 |
| 5,892,858 A | 4/1999 | Vaziri et al. | 385/2 |
| 5,917,638 A | 6/1999 | Franck et al. | 359/181 |
| 5,917,642 A | 6/1999 | O'Donnell et al. | 359/245 |
| 5,920,416 A | 7/1999 | Beylat et al. | 385/181 |
| 5,999,297 A | 12/1999 | Penninckx | 359/154 |
| 5,999,300 A | 12/1999 | Davies et al. | 359/183 |

(List continued on next page.)

FOREIGN PATENT DOCUMENTS

| | | |
|---|---|---|
| EP | 1 026 863 A2 | 8/2000 |
| WO | WO99/09682 | 2/1999 |

OTHER PUBLICATIONS

Ono, Yano, Fukuchi, Ito, Yamazaki, Yamaguchi & Emura, "Characteristics of Optical Duobinary Signals in Terabit/s Capacity, High–Spectral Efficiency WDM Systems", Journal of Lightwave Technology, vol. 16, No. 5, IEEE/OSA, May 1998.

Sieben, Conradi & Dodds, "Optical Single Sideband Transmission at 10 Gb/s Using Only Electrical Dispersion Compensation", Journal of Lightwave Technology, vol. 17, No. 10, IEEE/OSA, Oct. 1999.

Walklin & Conradi, "Multilevel Signaling for Increased the Reach of 10 Gb/s Lightwave Systems", Journal of Lightwave Technology, vol. 17, No. 11 IEEE/OSA, Nov. 1999.

(List continued on next page.)

Primary Examiner—Leslie Pascal
Assistant Examiner—Hanh Phan
(74) Attorney, Agent, or Firm—David R. Gildea

(57) ABSTRACT

Methods and apparatus to transmit and receive information bits encoded in duobinary, multilevel pulse-amplitude-modulated (PAM) optical signals are described. The transmitted optical signal has a narrow optical spectrum and a low symbol rate. Information bits are encoded in a M-ary PAM symbol sequence, where $M \geq 3$. The subsequence-based encoder decomposes the PAM symbol sequence into M1 subsequences, precodes each subsequence, performs duobinary filtering on each precoded subsequence, and forms a weighted sum of the duobinary precoded subsequences. The weighted sum of duobinary precoded subsequences is lowpass filtered and modulated onto an optical electric field. The receiver processes a received optical electric field to obtain an electrical signal proportional to the received optical intensity, and performs M-ary symbol-by-symbol decisions to recover the transmitted information bits, without potential error propagation.

30 Claims, 23 Drawing Sheets

U.S. PATENT DOCUMENTS

| | | | | |
|---|---|---|---|---|
| 6,002,816 | A | | 12/1999 | Penninckx et al. ............. 385/3 |
| 6,097,525 | A | | 8/2000 | Ono et al. .................. 359/181 |
| 6,188,497 | B1 | * | 2/2001 | Franck et al. ............... 359/181 |
| 6,337,756 | B1 | * | 1/2002 | Djupsjobacka ............. 359/181 |
| 6,362,913 | B2 | * | 3/2002 | Ooi et al. ................... 359/245 |
| 6,388,786 | B1 | * | 5/2002 | Ono et al. .................. 359/181 |

OTHER PUBLICATIONS

May, Solheim & Conradi, "Extended 10 Gb/s Fiber Transmission Distance at 1538 nm Using a Duobinary Receiver", IEEE Photonics Technology Letters, vol. 6, No. 5, IEEE, May 1994.

Price, Pierre, Uhel & Havard, "210 k Repeaterless 10 Gb/s Transmission Experiment Through Nondispersion–Shifted Fiber Using Partial Response Scheme", IEEE Photonics Technology Letters, vol. 7, No. 10, IEEE, Oct. 1995.

Penninckx, Chbat, Pierre & Thiery, "The Phase–Shaped Binary Transmission (PSBT): A New Technique to Transmit Far Beyond the Chromatic Dispersion Limit", IEEE Photonics Technology Letters, vol. 9, No. 2, IEEE, Feb. 1997.

Shtaif & Gnauck, "The Relation Between Optical Duobinary Modulation and Spectral Effciency in WDM Systems", IEEE Photonics Technology Letters, vol. 11, No. 6, IEEE, Jun. 1999.

Walklin & Conradi, "Multilevel Signaling for Extending the Dispersion–Limited Transmission Distance in High Speed, Fiber Optic Communication Systems", Conference Paper at 1996 Canadian Conference on Electrical and Computer Engineering, Glimpes into the 21st Century, Cat. No. 96TH8157, Calgary, Alta. Canada, May 26–29, 1996, published New York, NY, USA, 1996, p. 223–6, vol. 1.

Walklin & Conradi, "A10 Gb/s4–ary ASK Lightwave System" Conference Paper at IOOC ECOC 97 (Conf. Publ No. 448), 11th International Conference on Integrated Optics and Optical Fibre Communications, Edinburgh, UK, Sep. 1997, London UK: IEE, 1997, p. 255–8, vol. 3.

Stark, Mazo & Laroia, "Phased Amplitude–Shift Signaling (PASS) Code: Increasing the Spectral Efficiency of DWDM Transmission", Conference Paper at 24th European Conference on Optical Communication ECOC '98, IEEE Cat. No. 98TH8398, Madrid, Spain, Sep. 24, 1998, published Madrid, Spain: Telefonica, 1998, p. 373–4 vol. 1.

Stark, Mazo & Laroia, "Line Coding for Dispersion Tolerance and Spectral Efficiency: Duobinary and Beyond", Conference Paper at OFC/IOOC'99 Optical Fiber Communication Conference and the International Conference on Integrated Optics and Optical Fiber Communications, Cat. No. 99CH36322, San Diego, CA, USA, Feb. 21–26, 1999, published Piscataway, NJ, USA, 1999, p. 331–3 vol. 2.

Price & Mercier, "Reduced Bandwidth Optical Digital Intensity Modilation with Improved Chromatic Dispersion Tolerance", Electronic Letters, vol. 31, No. 1, IEE, Jan. 5th 1995, pp. 58–59.

Kuwano, Yonenaga & Iwashita, "10 Gbit/s Repeaterless Transmission Experiment of Optical Duobinary Modulated Signal", Electronic Letters, vol. 31, No. 16, IEE, Aug. 3 1995, pp. 1359–1361.

Sieben, Conradi, Dodds, Davies & Walkin, "10 Gbit/s Optical Single Sideband System", Electronic Letters, vol. 33, No. 11, IEE, May 22 1997, pp. 971–973.

Penninckx, "Enhanced–Phase–Shaped Binary Transmission", Electronic Letters, vol. 36, No. 5, IEE, Mar. 2 2000, pp. 478–480.

* cited by examiner

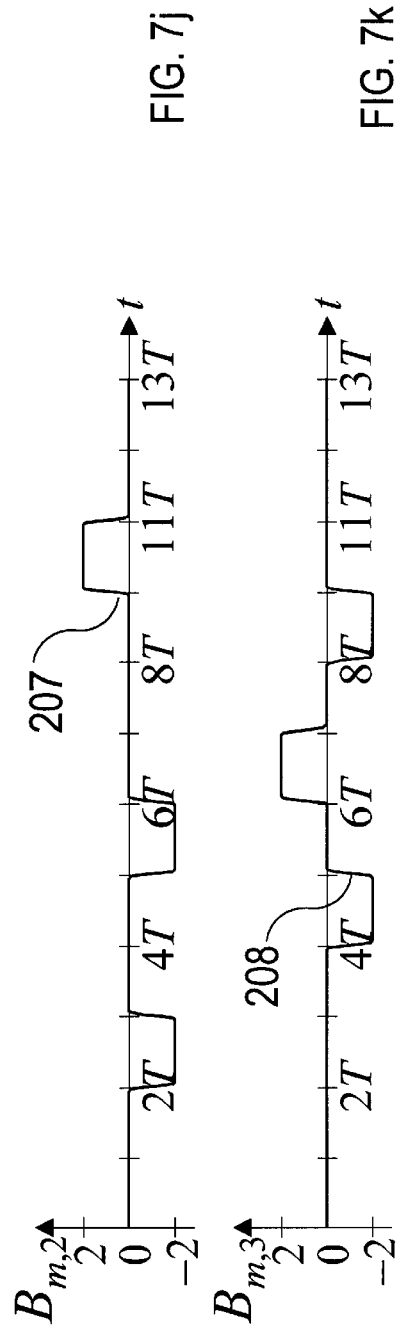
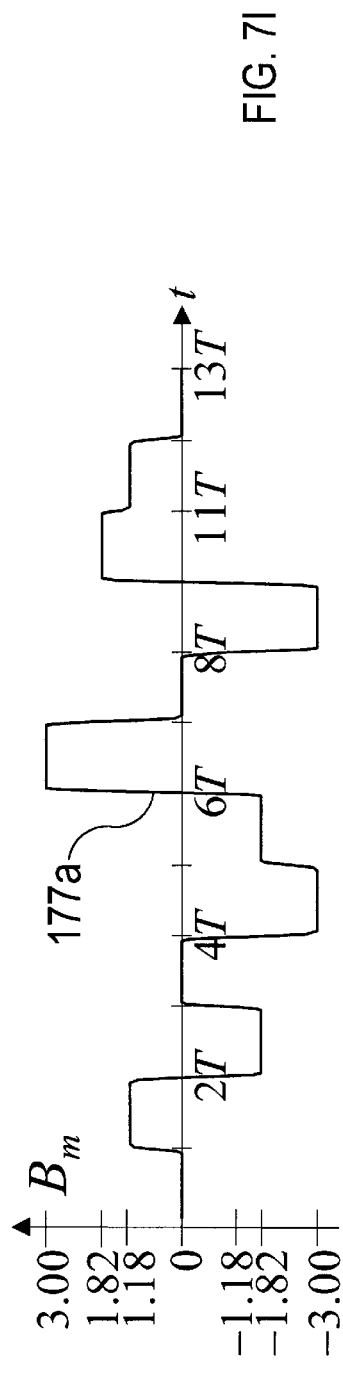
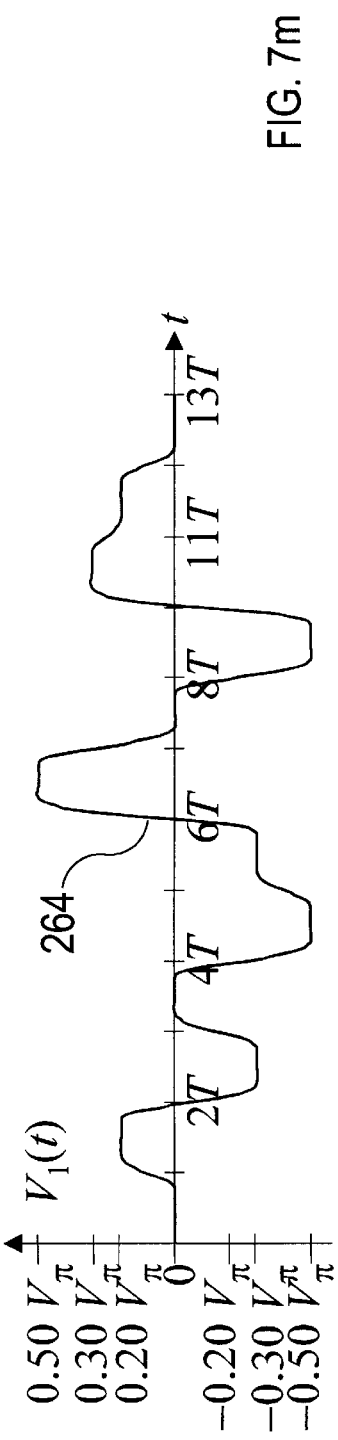

TRANSMISSION AND RECEPTION OF DUOBINARY MULTILEVEL PULSE-AMPLITUDE-MODULATED OPTICAL SIGNALS USING SUBSEQUENCE-BASED ENCODER

BACKGROUND OF THE INVENTION

1. Field of the Invention

The invention relates generally to optical communication systems and, more particularly, to transmission and reception of digital information bits encoded in duobinary, multilevel pulse-amplitude modulation optical signals which, for a given bit rate, have a narrow optical spectrum and low symbol rate, and enable the information bits to be recovered from the intensity of the received optical signal without potential error propagation.

2. Description of the Prior Art

It is well known that in optical communication systems conveying digital information, whether they transmit a single signal at a single carrier wavelength or transmit multiple signals at different carrier wavelengths (i.e., employ wavelength-division multiplexing), for a fixed bit rate per carrier wavelength, it is beneficial to design the transmitted signal to have a narrow optical spectrum and to use a long symbol interval. Throughout this patent, the term "optical spectrum" refers to the power spectral density of the transmitted optical electric field.

Furthermore, implementation of optical communication systems is simplified greatly if the transmitted signal is designed so that the transmitted information bits can be recovered at the receiver simply by extracting from the received optical signal an electrical signal proportional to the intensity of the received optical signal (i.e., the absolute square of the received optical electric field), and performing symbol-by-symbol decisions. Currently, almost all practical optical communication systems use direct detection, in which a photodetector generates a photocurrent proportional to the received optical signal intensity. It is also possible to extract an electrical signal proportional to the received optical signal intensity through other means, e.g., asynchronous homodyne or asynchronous heterodyne detection.

Single-sideband amplitude modulation is a traditional means to narrow the spectrum of a modulated signal by a factor of two, and involves modulation of a signal and its Hilbert transform onto quadrature carriers at the same carrier frequency. A few prior works have described single-sideband modulation of optical signals, but the single-sideband optical modulation schemes proposed to date are very difficult to implement in practice. Vestigial-sideband amplitude modulation is essentially an imperfect practical implementation of single-sideband amplitude modulation. Optical vestigial-sideband amplitude modulation can be implemented by first generating an amplitude-modulated optical signal and then filtering it with an optical filter having a sharp cutoff centered at the optical carrier frequency but, in practice, it is difficult to fabricate filters having sufficiently sharp cutoff and to match the optical carrier frequency and filter cutoff frequency with sufficient accuracy.

Multiple-subcarrier modulation (also called subcarrier multiplexing) represents a well-known approach to increasing the symbol interval. In this approach, the information bit stream is divided into multiple substreams at lower bit rates, and each substream is modulated onto an electrical subcarrier at a different subcarrier frequency. The modulated subcarriers are summed to form a frequency-division-multiplexed electrical signal, which is then modulated onto an optical carrier, usually by intensity modulation. While multiple-subcarrier modulation lengthens the interval of symbols transmitted on individual subcarriers, it does not necessarily reduce the total optical bandwidth of the transmitted signal. Multiple-subcarrier modulation offers poor average optical-power efficiency (e.g., compared to on-off keying, which is the same as 2-ary pulse-amplitude modulation), and this efficiency decreases further as the number of subcarriers is increased. Multiple-subcarrier modulation requires transmitters and receivers significantly more complicated than those required by baseband modulation techniques, such as on-off keying and M-ary pulse-amplitude modulation.

Modulation of information bits onto optical signals using M-ary phase-shift keying (for $M \geq 3$) or using M-ary quadrature-amplitude modulation (for $M \geq 4$) represent other well-known means to narrow the optical spectrum and lengthen the symbol interval of the transmitted signal. However, very complicated phase-sensitive detection techniques are required to recover the transmitted bits, such as synchronous homodyne or synchronous heterodyne detection.

It is well-known that M-ary pulse-amplitude modulation, in which information bits are encoded in one of M intensity levels during each symbol interval, where $M \geq 3$, represents a means to narrow the optical spectrum and lengthen the symbol interval as: compared to on-off keying (which is equivalent to 2-ary pulse-amplitude modulation). It is well-known that for a given information bit rate, as M is increased, the spectrum narrows and the symbol interval increases. A key drawback of M-ary pulse-amplitude modulation is that for a given M, it does not offer the maximal spectral narrowing that can be achieved.

M-ary pulse-amplitude modulation with duobinary encoding is a well-known modulation technique that has been widely studied for a variety of communication media. For reasons to be described below, to date, only M=2 has been chosen in optical communication systems. In this technique, a sequence of M-ary pulse-amplitude modulation symbols, $I_m$, where m is a time index of symbol intervals, is encoded to yield a duobinary symbol sequence $B_m = I_m + I_{m-1}$, which is transmitted. Duobinary encoding narrows the spectrum of the transmitted signal, and choosing M>2 provides additional spectral narrowing and lengthens the symbol interval. A duobinary M-ary pulse-amplitude modulation signal takes on 2M−1 possible levels, including M−1 negative levels, M−1 positive levels, and zero. Optimal detection of duobinary M-ary pulse-amplitude modulation signals requires maximum-likelihood sequence detection, but at high bit rates, this is difficult to implement, so that symbol-by-symbol detection is typically performed, and the symbol sequence $I_m$ is precoded to avoid error propagation in the recovered information bits.

Numerous patents and research papers have documented the use of 2-ary pulse-amplitude modulation (which is equivalent to on-off keying) with duobinary encoding in optical communication systems. To our knowledge, all of these works have utilized precoding to permit symbol-by-symbol detection without error propagation. While these works have described many different techniques to implement precoding, duobinary encoding and modulation of the duobinary signal onto the optical carrier, all of these techniques result in transmission of equivalent optical signals, which take on one of three possible electric-field amplitude values, e.g., $\{-a, 0, a\}$. Using precoded, 2-ary pulse-amplitude modulation with duobinary encoding, it is possible to recover the transmitted information bits by performing symbol-by-symbol detection on a signal proportional to the received optical intensity, such as the photocurrent in a direct-detection receiver. 2-ary pulse-amplitude modulation with duobinary encoding offers essentially the same average optical-power efficiency as on-off keying. While this technique narrows the optical spectrum by about a factor of two (as compared to on-off keying), it does not provide the narrowing that would be possible for M>2, nor does it lengthen the symbol interval (as compared to on-off keying).

It is highly desirable to employ duobinary M-ary pulse-amplitude modulation, M>2, in optical communication systems, to achieve both a narrower optical spectrum and a longer symbol interval. However, with all previously known preceding techniques, it is not possible to recover the transmitted information bits using symbol-by-symbol detection on a signal proportional to the received optical intensity, such as the photocurrent in a direct-detection receiver, without potential error propagation. Using all previously known preceding techniques, for M>2, it would be necessary to employ a complicated, phase-sensitive detection technique to receive the optical signal, e.g., synchronous homodyne or synchronous heterodyne detection. Hence, to date, it has not been possible to use duobinary M-ary pulse-amplitude modulation, for M>2, in practical optical communication systems using direct-detection receivers.

There is a need for methods and apparatus to transmit and receive duobinary M-ary pulse-amplitude-modulated signals in optical communication systems, for any choice of M>2, and for any choice of the M intensity levels, where the signals are precoded such that the transmitted information bits can be recovered using symbol-by-symbol detection on a signal proportional to the received optical intensity, e.g., by using a simple direct-detection receiver, without potential error propagation.

SUMMARY OF THE INVENTION

It is therefore an object of the present invention to provide methods and apparatus to transmit and receive duobinary M-ary pulse-amplitude-modulated optical signals, for M>2, in optical communication systems.

Another object is to provide methods and apparatus to precode duobinary M-ary pulse-amplitude-modulated optical signals, for $M \geq 2$, such that the transmitted information bits can be recovered using symbol-by-symbol detection on a signal proportional to the received optical intensity, e.g., by using a simple direct-detection receiver, without the potential for error propagation.

Briefly, in a preferred embodiment of a duobinary M-ary pulse-amplitude modulation optical transmission system, information bits to be transmitted are formed into blocks of k bits, where $k \leq \log_2 M$. Blocks of k bits are input to a M-ary pulse-amplitude modulation symbol encoder, which encodes each block into a pulse-amplitude modulation symbol taking on one of M levels $D^{(0)}, \ldots, D^{(M-1)}$, where $M \geq 2$. This encoding is performed using Gray coding. The encoder output is a M-ary pulse-amplitude modulation symbol sequence $D_m$, where the duration of each symbol is T, and m is a time index counting symbol intervals. When M>2, for a given information bit rate, the duration of each symbol is longer than the symbol duration using 2-ary pulse-amplitude modulation (which is equivalent to on-off keying).

The M-ary pulse-amplitude modulation symbol sequence is input to a subsequence decomposer, which forms a set of M−1 logical subsequences, $S_{m,1}$ through $S_{m,M-1}$. Each of the logical subsequences is a binary sequence having symbol interval T, and each is associated with one of the M−1 levels $D^{(1)}$ through $D^{(M-1)}$. Note that there is no subsequence associated with the level $D^{(0)}$. During each symbol interval, a given logical subsequence takes on a logical 0 unless the M-ary pulse-amplitude modulation symbol sequence takes on the corresponding level, in which case, that subsequence takes on a logical 1.

Each of the M−1 logical subsequences is input to one of M−1 logical subsequence precoders. The outputs of these M−1 logical subsequence precoders are the M−1 logical precoded subsequences $P_{m,1}$ through $P_{m,M-1}$, which are related to the logical subsequences by $P_{m,i} = \bar{S}_{m,i} - P_{m-1,i} \pmod{2}$, for i=1, . . . ,M−1. This precoding is performed to make it possible for a receiver to recover the information bits by making M-ary symbol-by-symbol decisions on a signal proportional to the received optical intensity, without the potential for error propagation. The set of M−1 logical precoded subsequences, which take on the levels 0 or 1, is converted to a set of corresponding bipolar precoded subsequences $I_{m,1}$ through $I_{m,M-1}$, which take on the levels −1 or 1.

Each of the M−1 bipolar precoded subsequences $I_{m,1}$ through $I_{m,M-1}$ is input to one of M−1 duobinary filters. Each duobinary filter includes a one-symbol delay and a summer interconnected in a delay-and-add configuration. The outputs of these M−1 duobinary filters are the duobinary precoded subsequences $B_{m,1}$ through $B_{m,M-1}$, which are related to the bipolar precoded subsequences by $B_{m,i} = I_{m,i} + I_{m-1,i}$, for i=1, . . . , M−1. In other words, each duobinary filter forms the running sum of its input values during two consecutive symbol intervals, for the purpose of introducing correlation, which results in a narrowing of the optical spectrum of the transmitted optical signal by approximately a factor of two as compared to a M-ary pulse-amplitude modulation signal that has not been duobinary encoded. During a given symbol interval, at most one of the duobinary precoded subsequences $B_{m,1}$ through $B_{m,M-1}$ takes on a nonzero value.

Each of the duobinary precoded subsequences $B_{m,1}$ through $B_{m,M-1}$ is weighted by a corresponding gain $G_1$ through $G_{M-1}$, where the gains are monotonically increasing, i.e., $G_{M-1} > \ldots > G_1$. The weighted subsequences are summed to form the duobinary precoded pulse-amplitude modulation symbol sequence $$B_m = \sum_{i=1}^{M-1} G_i B_{m,i},$$

which takes on 2M−1 levels. The sequence $B_m$ is lowpass-filtered, resulting in the duobinary precoded pulse-amplitude modulation signal s(t), which takes on 2M−1 levels.

The duobinary precoded pulse-amplitude modulation signal s(t) is then modulated onto an optical carrier using a modulation subsystem. In the modulation subsystem, a laser or other light source generates an unmodulated optical carrier, which is input to a dual-drive, push-pull, Mach-Zehnder interferometric intensity modulator. The intensity modulator is driven by complementary drive signals $V_1(t) = Gs(t)$ and $V_2(t) = -Gs(t)$, each of which takes on values between $-V_\pi/2$ and $V_\pi/2$, where $V_\pi$ is the drive voltage required to produce a phase shift of $\pi$. The intensity modulator is biased by a d.c. bias chosen so that the modulator output is approximately zero when the drive signals $V_1(t)$ and $V_2(t)$ are zero. The modulator output is a duobinary M-ary pulse-amplitude-modulated optical signal described by the transmitted optical electric field $E_{trans}(t)$, which takes on 2M−1 levels, including M−1 positive levels, M−1 negative levels (which are the negatives of the M−1 positive levels), and one level that is approximately zero. The transmitted optical electric field $E_{trans}(t)$ is launched into the optical transmission medium, which may be a fiber or free-space optical medium.

At the output of the optical transmission medium, the received duobinary M-ary pulse-amplitude-modulated optical signal is described by the received optical electric field $E_{rec}(t)$. The transmitted information bits can be recovered from the received optical electric field $E_{rec}(t)$ using a direct-detection receiver, an asynchronous homodyne receiver, or an asynchronous heterodyne receiver. While each of these three receiver designs is implemented differently, each extracts from the received optical electric field $E_{rec}(t)$ a M-ary pulse-amplitude modulation signal v(t), which depends on $E_{rec}(t)$ only through the received optical intensity $I_{rec}(t)=|E_{rec}(t)|^2$. Accordingly, the M-ary pulse-amplitude modulation signal v(t) takes on M−1 positive levels and one level that is approximately zero. The M-ary pulse-amplitude modulation signal v(t) is input to a M-ary pulse-amplitude modulation decision device, which performs M-ary symbol-by-symbol decisions by comparing the M-ary pulse-amplitude modulation signal v(t) to a set of M−1 thresholds. Because the M-ary pulse-amplitude modulation decision device does not perform decisions by comparing values of the M-level pulse-amplitude modulation signal v(t) in successive symbol intervals, decisions are not subject to error propagation. The M-ary pulse-amplitude modulation decision device yields at its output blocks of k recovered information bits, which are converted to a serial sequence of recovered information bits by a parallel-to-serial converter.

An advantage of the present invention is that the transmitted optical signal has a narrow optical spectrum, so that in wavelength-division-multiplexed systems, which utilize some form of optical or electrical filters to select the desired signal at the receiver, the spacing between carrier frequencies can be reduced subject to some constraints on the tolerable distortion to the desired signal caused by these filters and the tolerable crosstalk from undesired signals not rejected by these filters, thereby increasing the spectral efficiency of the system.

Another advantage of the present invention is that the transmitted optical signal has a narrow optical spectrum, reducing pulse spreading caused by chromatic dispersion in systems using single-mode fiber as the transmission medium.

Another advantage of the present invention is that the transmitted optical signal has a long symbol interval, improving the receiver's ability to recover the transmitted information bits in the presence of dispersion (i.e., pulse spreading) originating from several sources, including chromatic dispersion or polarization-mode dispersion in single-mode fiber, modal dispersion in multi-mode fiber, and multipath propagation in free-space links.

Another advantage of the present invention is that the transmitted optical signal has a long symbol interval, reducing the electrical bandwidth required of electrical-to-optical converters, optical-to-electrical converters and electrical components in the transmitter and receiver.

Another advantage of the present invention is that the transmitted optical signal has a long symbol interval, reducing the clock speed required in the transmitter and receiver.

Another advantage of the present invention is that the transmitted information bits can be recovered using symbol-by-symbol detection on a signal proportional to the received optical intensity, such as the photocurrent in a direct-detection receiver.

These and other objects and advantages of the present invention will no doubt become obvious to those of ordinary skill in the art after having read the following detailed description of the preferred embodiments, which are illustrated in the various figures.

IN THE DRAWINGS

Figure 3A:
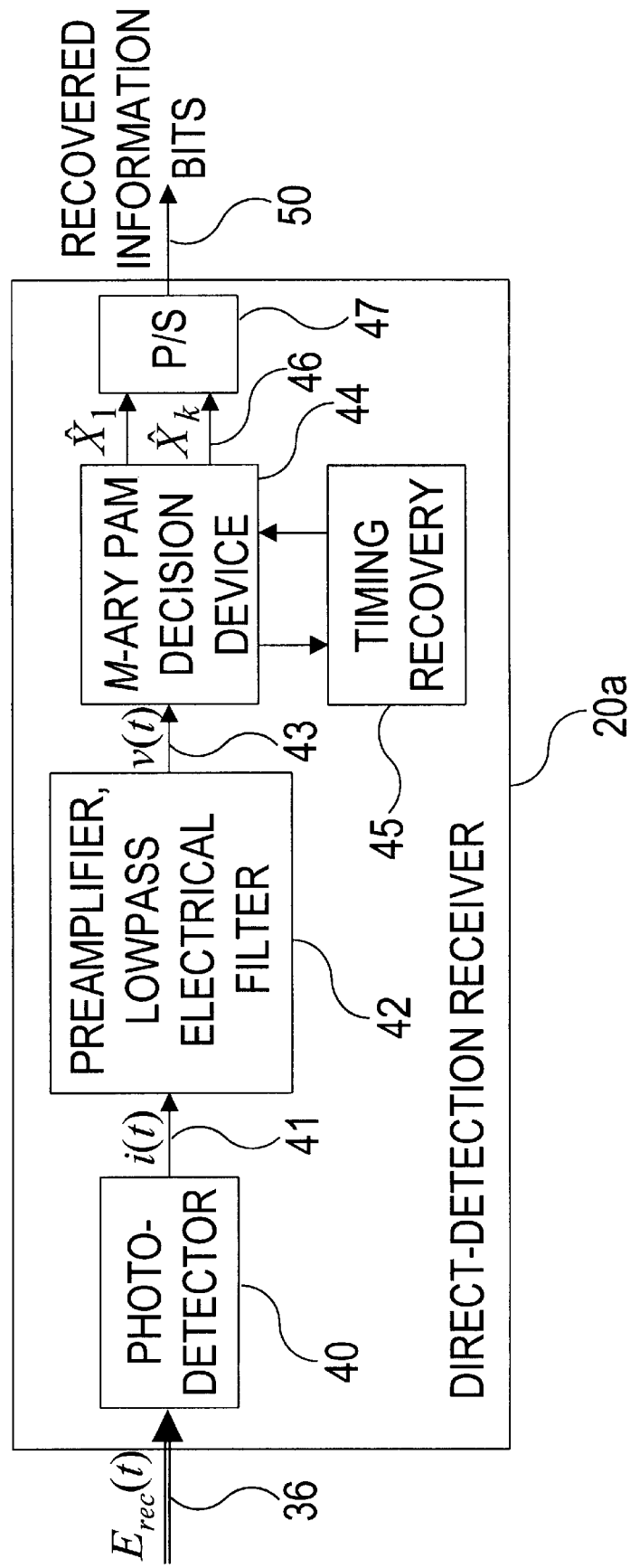
Figure 3B:
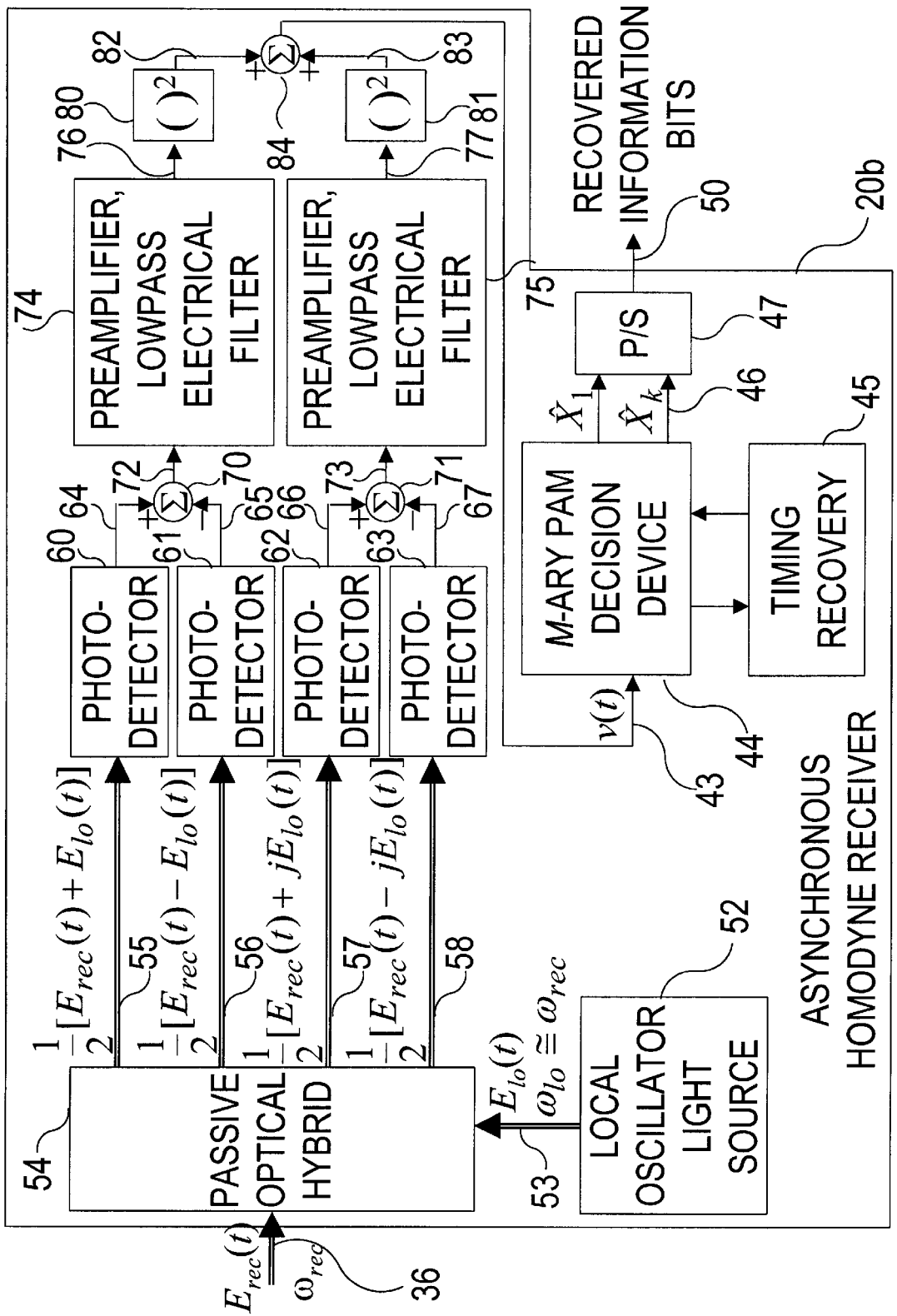
Figure 3C:
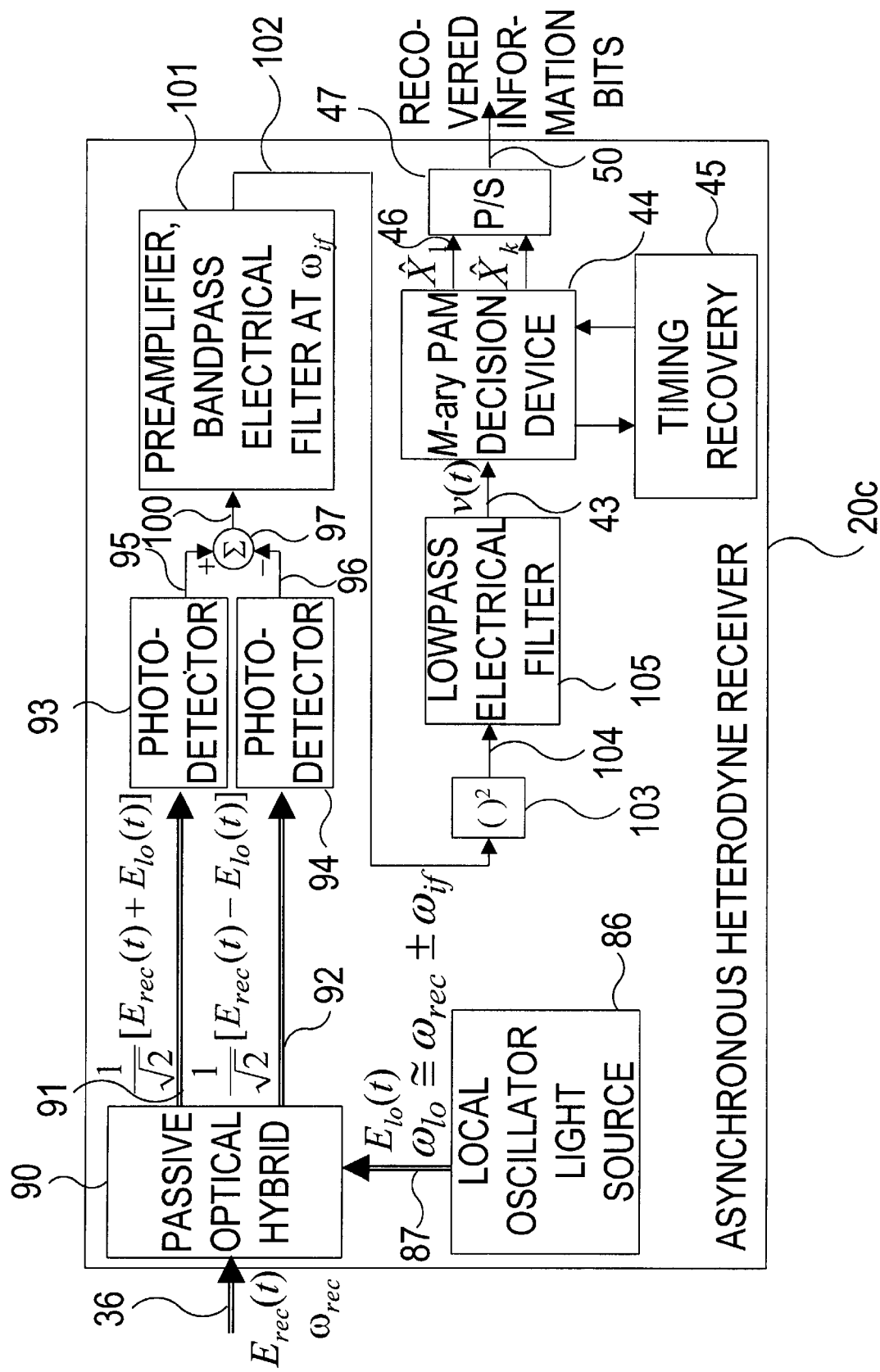
Figure 4A:
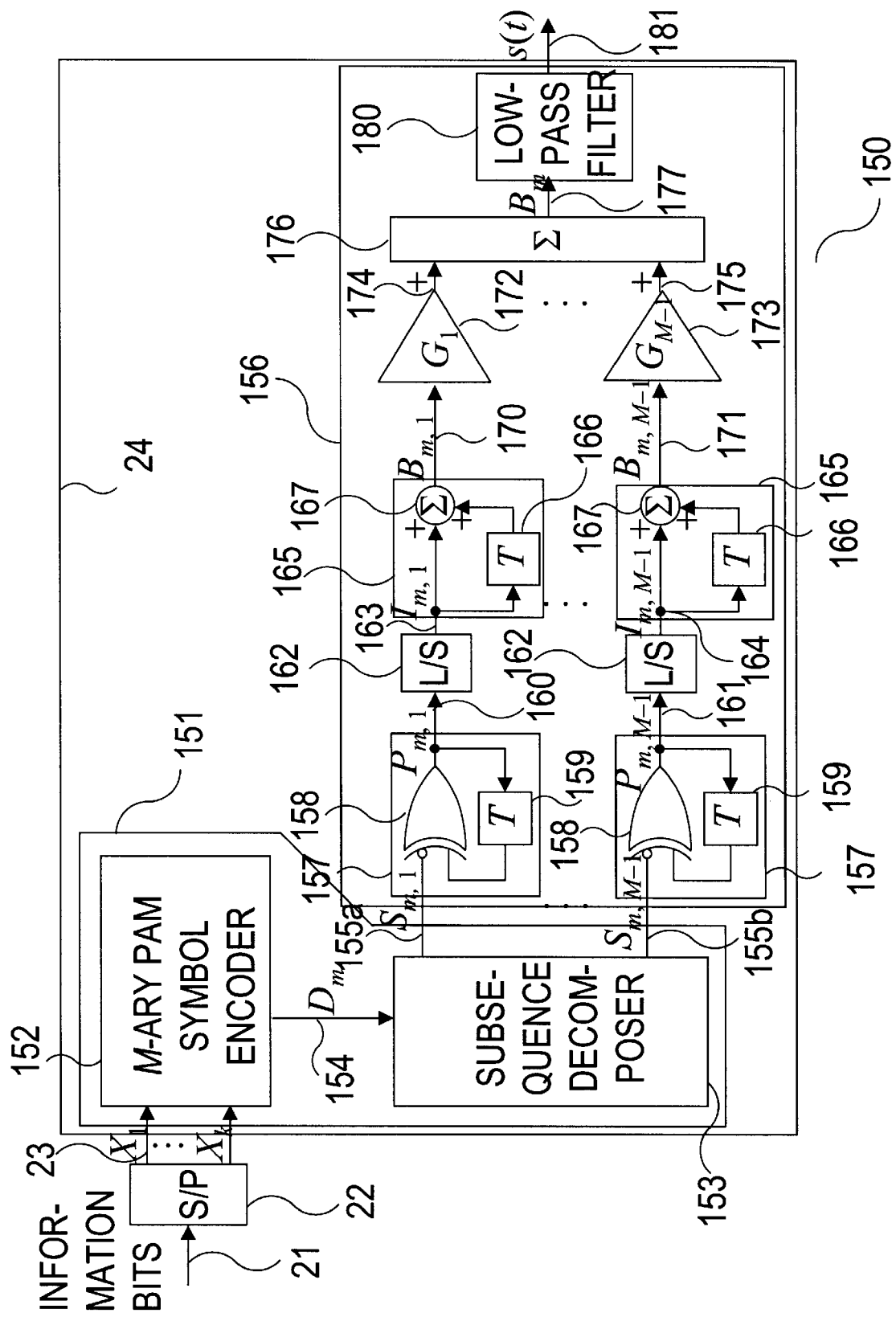
Figure 4B:
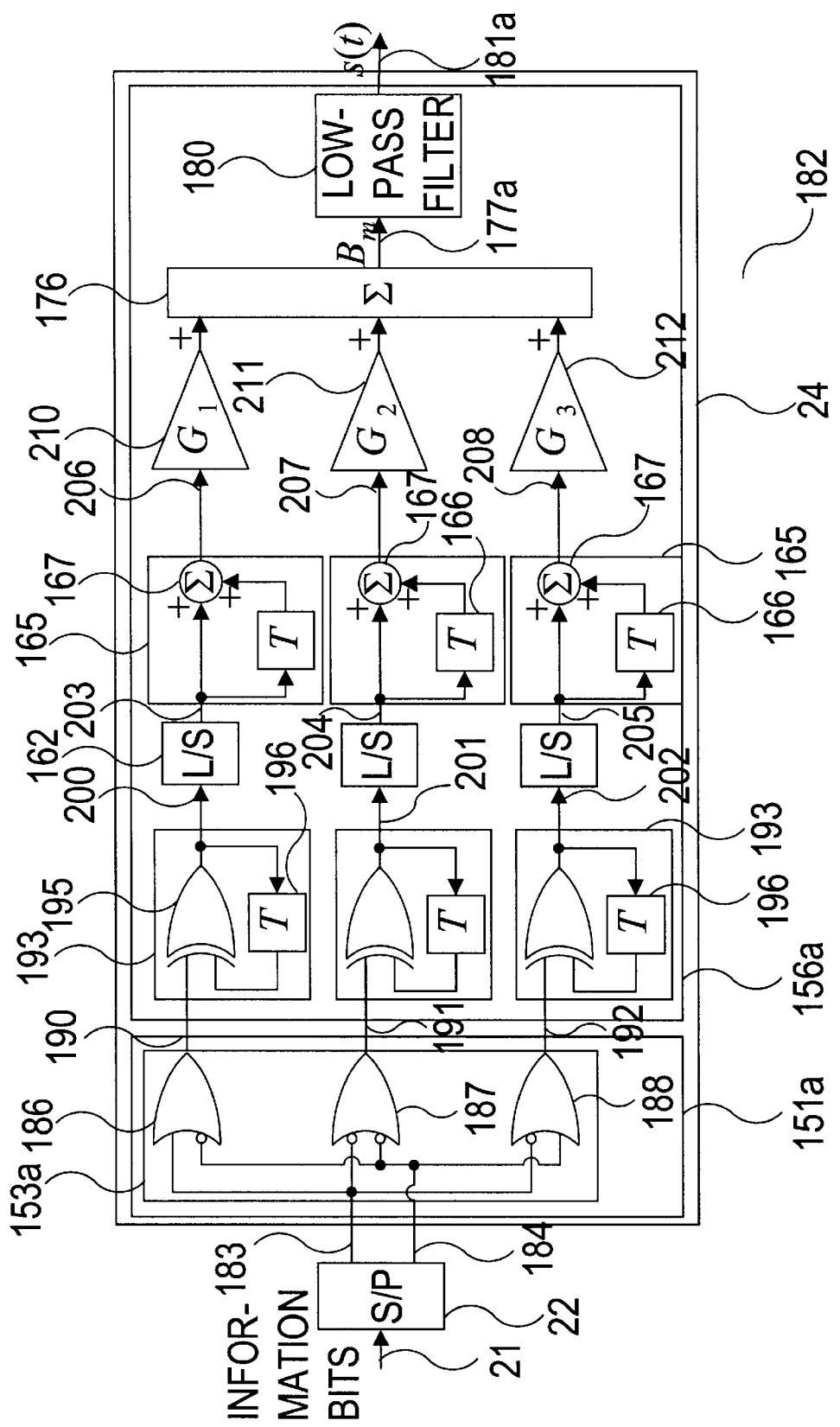
Figure 7A:
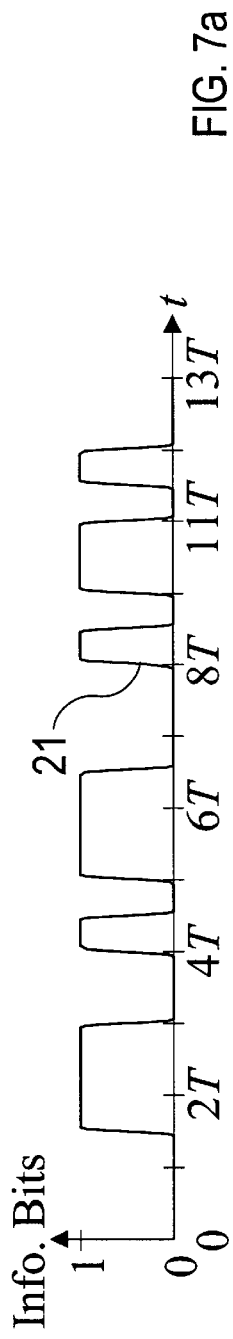
Figure 7B:
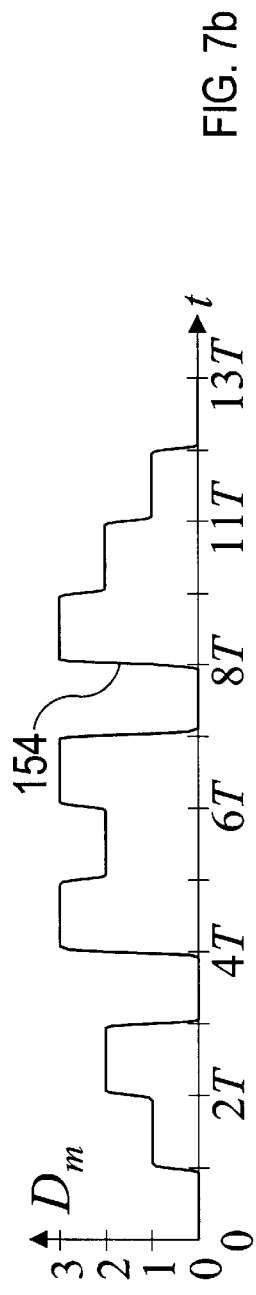
Figure 7C:
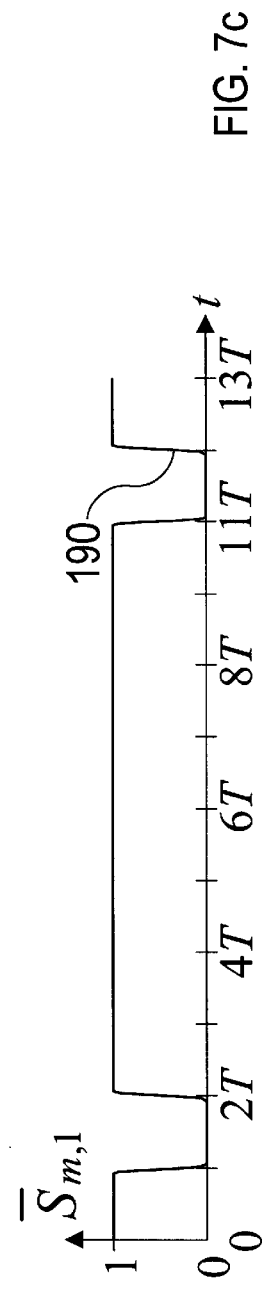
Figure 7D:
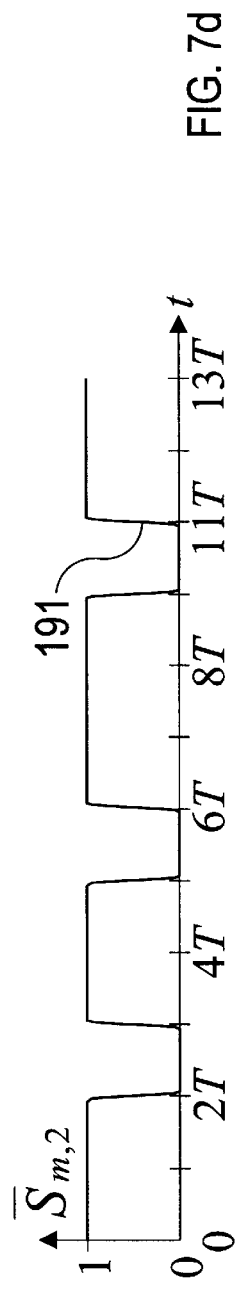
Figure 7E:
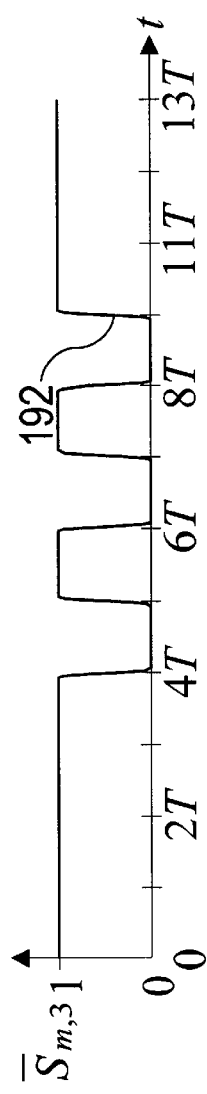
Figure 7F:
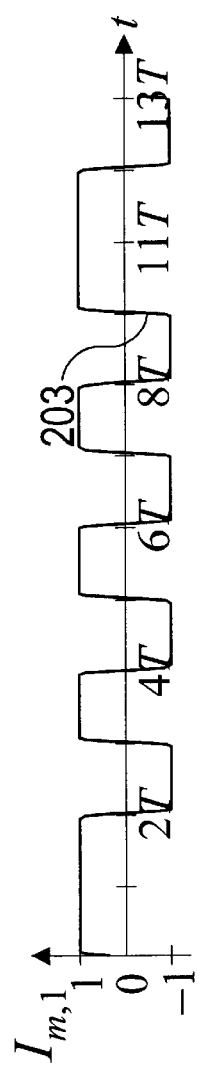
Figure 7G:
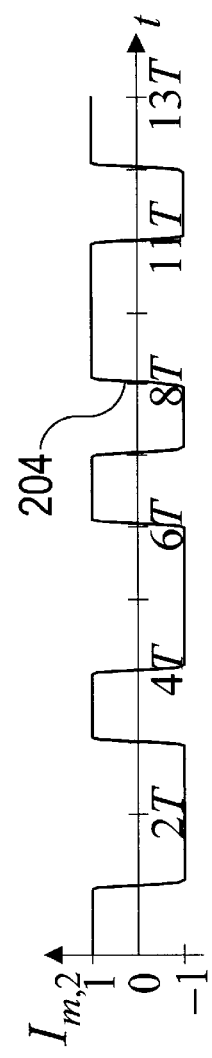
Figure 7H:
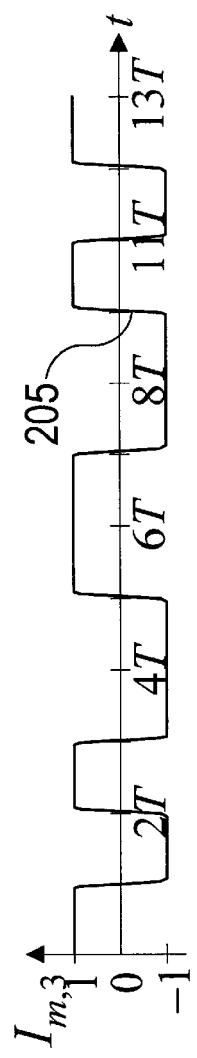
Figure 7I:
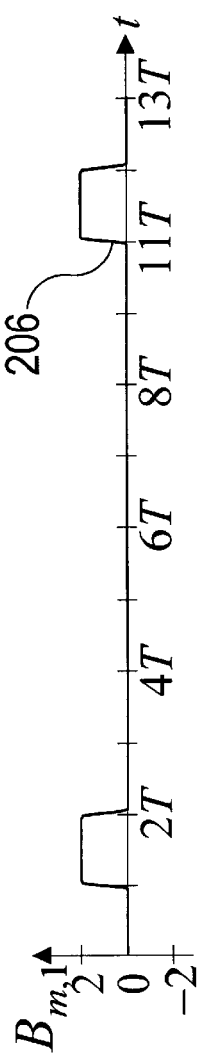
Figure 7N:
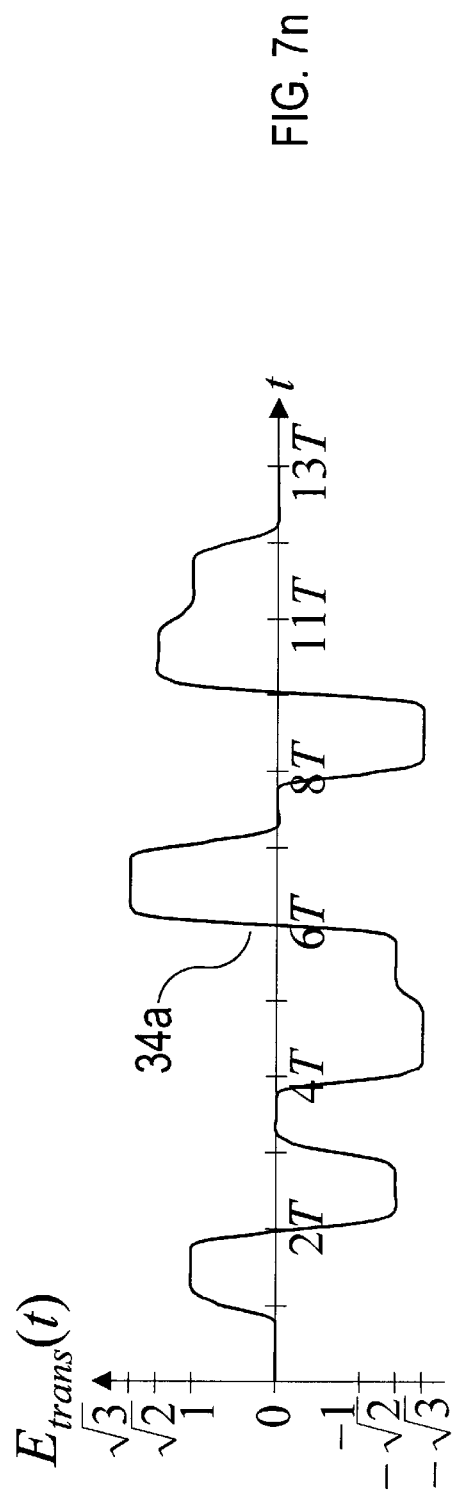
Figure 7O:
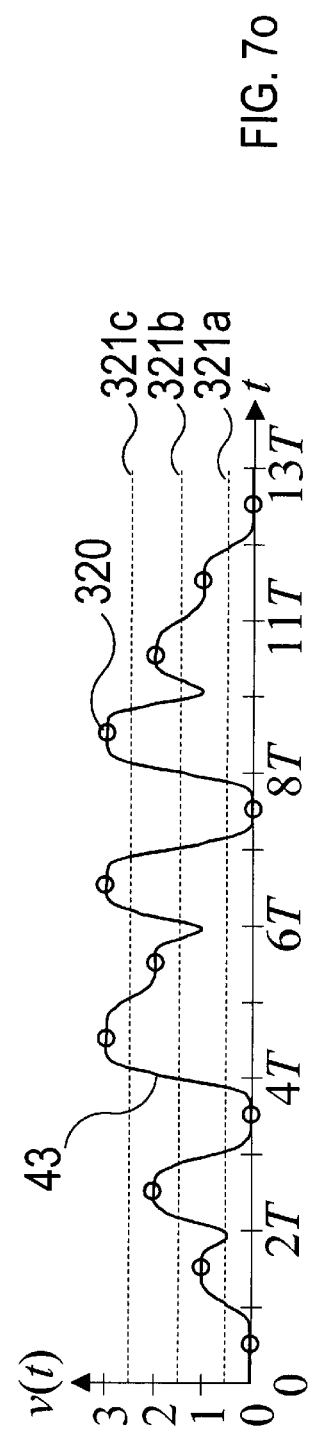
Figure 7P:
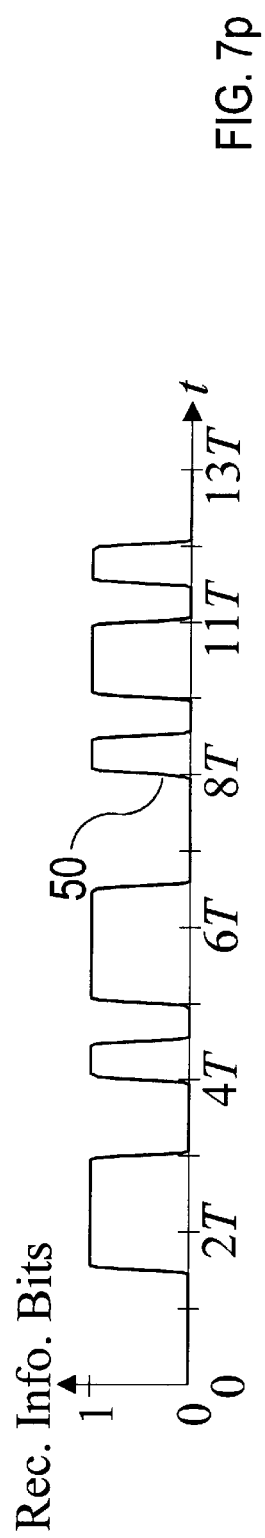
Figure 8A:
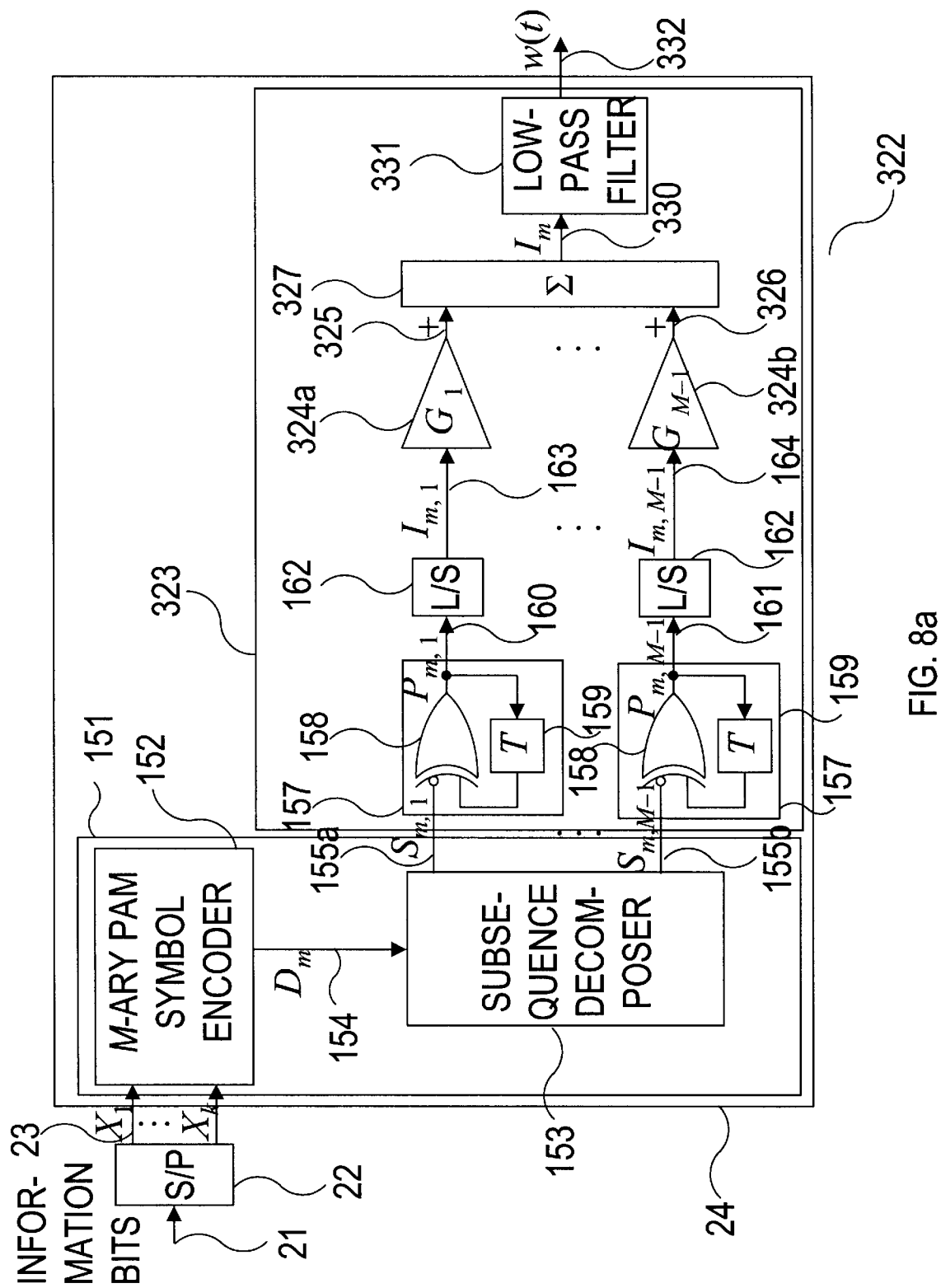
Figure 8B:
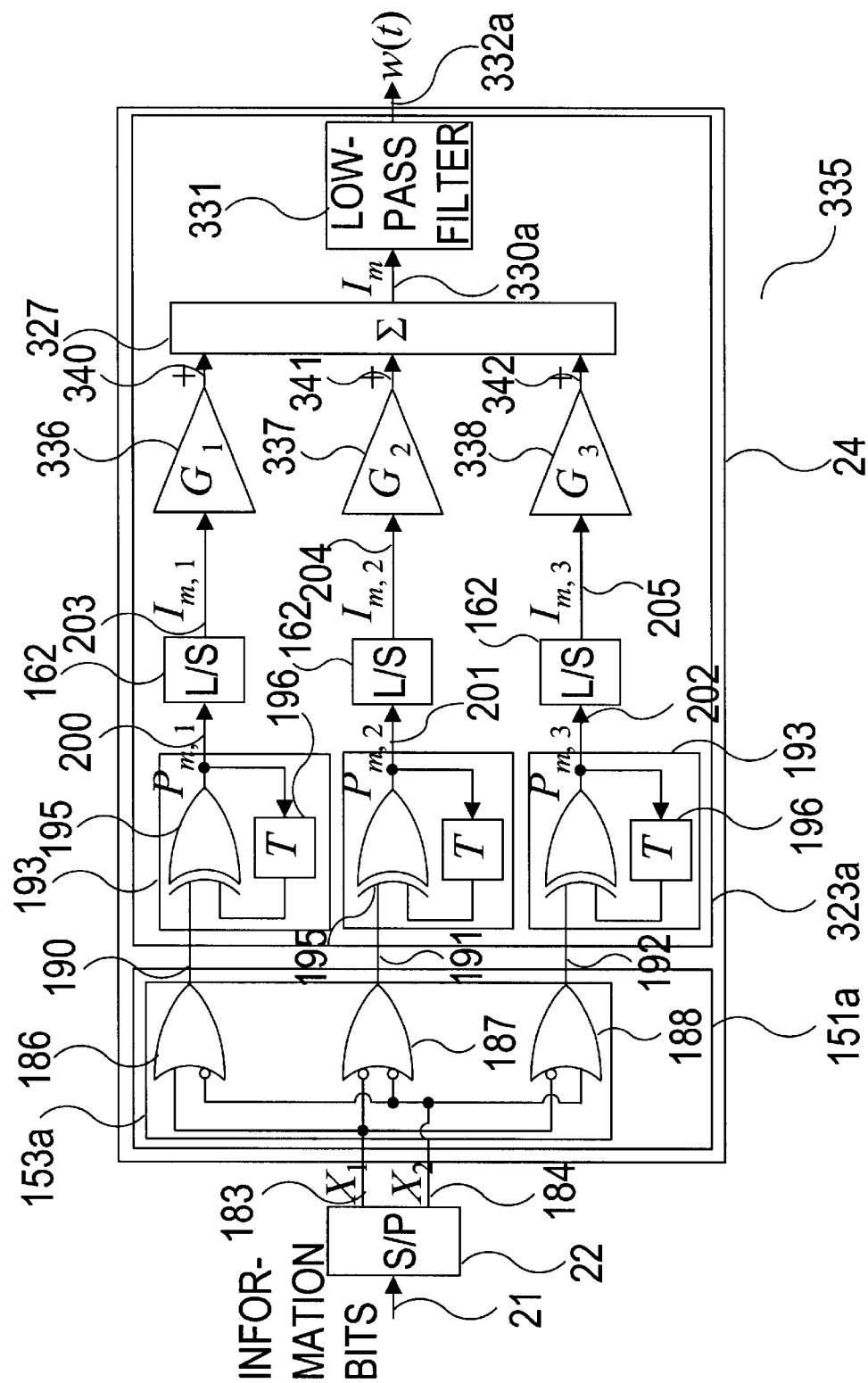
Figure 9:
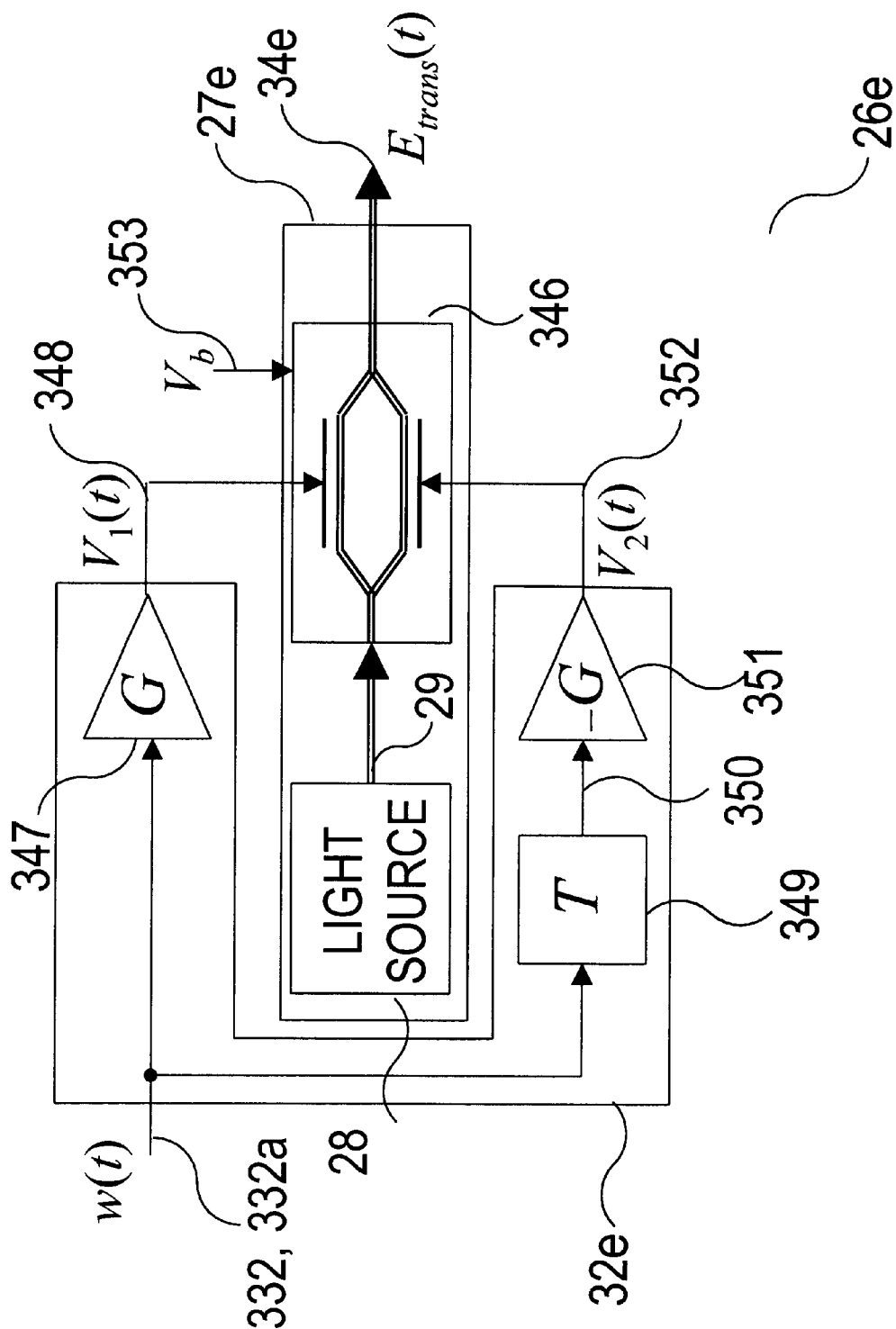
Figure 10:
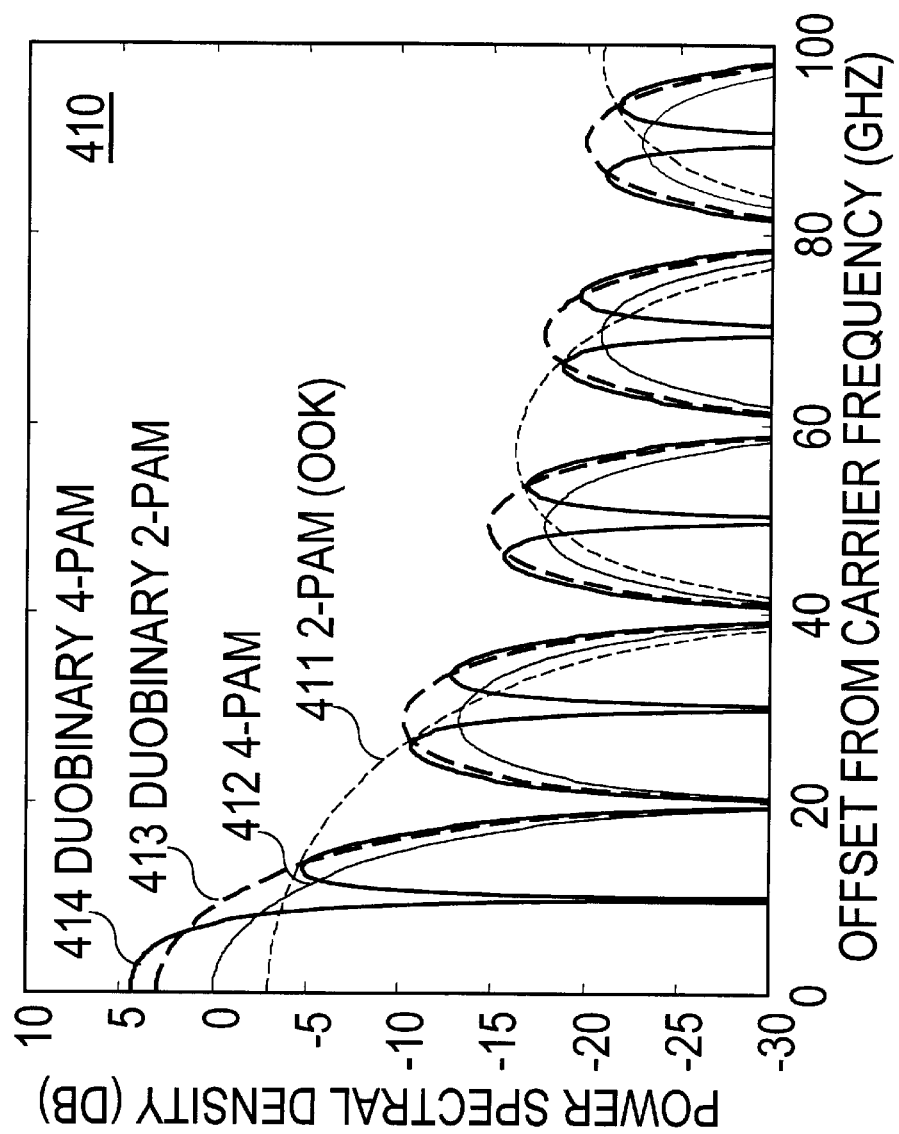

FIGS. 3a, 3b, and 3c are block diagrams of embodiments of receivers for duobinary M-ary pulse-amplitude-modulated optical signals of the present invention;

FIG. 4a is a block diagram of an embodiment of a duobinary M-ary pulse-amplitude modulation signal encoder of the present invention, and FIG. 4b is a block diagram of an embodiment of a duobinary 4-ary pulse-amplitude modulation signal encoder of the present invention;

FIGS. 5a, 5b, 5c and 5d are block diagrams of embodiments of modulation subsystems for modulating an electrical signal onto an optical carrier electric field;

FIGS. 6a–6h are input-output transfer characteristics of optical modulators;

FIGS. 7a–7p are waveforms of electrical and optical signals in a duobinary 4-ary pulse-amplitude modulation transmitter and receiver of the present invention;

FIG. 8a is a block diagram of an embodiment of a duobinary M-ary pulse-amplitude modulation signal encoder of the present invention, and FIG. 8b is a block diagram of an embodiment of a duobinary 4-ary pulse-amplitude modulation signal encoder of the present invention;

FIG. 9 is a block diagram of an embodiment of a modulation subsystem for modulating an electrical signal onto an optical carrier electric field; and FIG. 10 are optical spectra of the transmitted optical electric field for four encoding techniques: duobinary 4-ary pulse-amplitude modulation following the present invention, duobinary 2-ary pulse-amplitude modulation, 4-ary pulse-amplitude modulation, and 2-ary pulse-amplitude modulation (on-off keying).

DETAILED DESCRIPTION OF THE PREFERRED EMBODIMENTS

Figure 1:
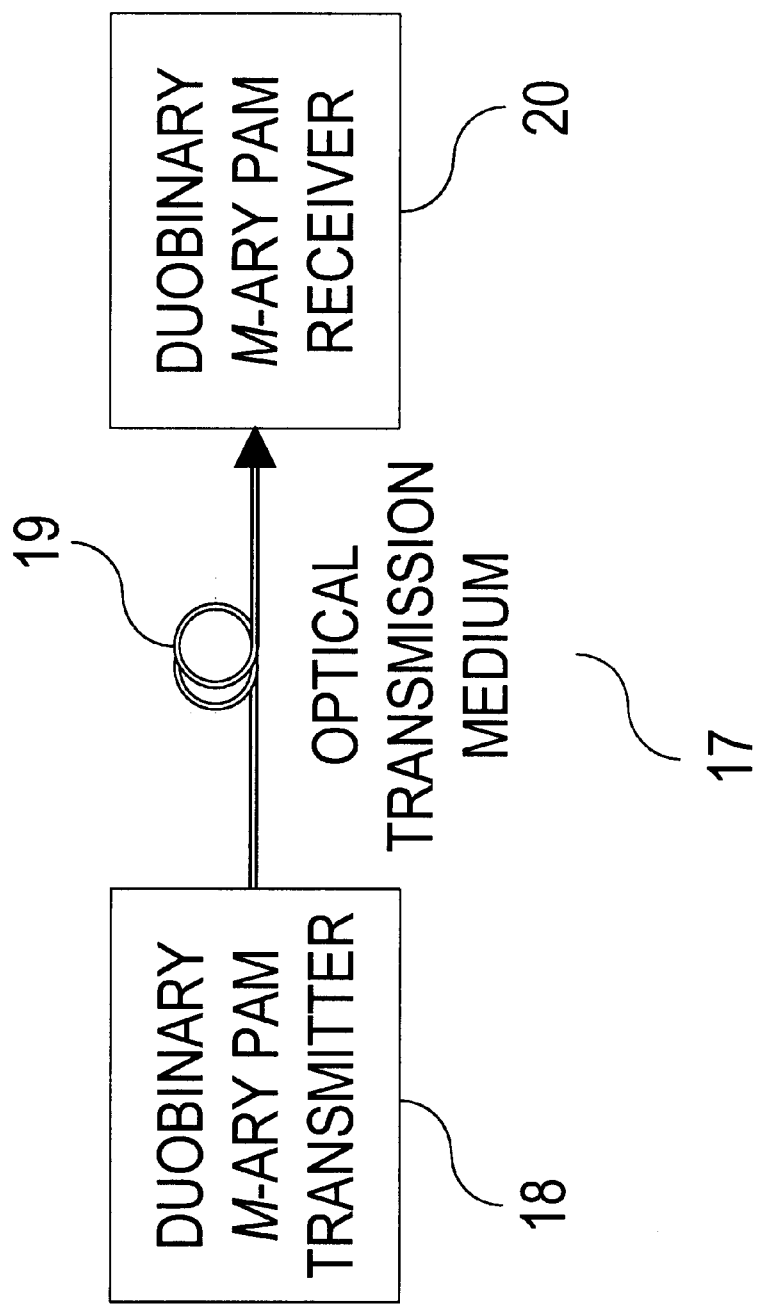
FIG. 1 is an optical communication system using a duobinary M-ary pulse-amplitude modulation transmitter and a duobinary M-ary pulse-amplitude modulation receiver of the present invention.

FIG. 1 is a block diagram of a system for conveying information bits through an optical transmission medium following the present invention, and is given a general reference number 17. A duobinary M-ary pulse-amplitude modulation transmitter 18 encodes the information bits into an optical signal, and transmits the optical signal into an optical transmission medium 19. The optical signal received through 19 is decoded by a duobinary M-ary pulse-amplitude modulation receiver 20, which recovers the information bits.

Figure 2:
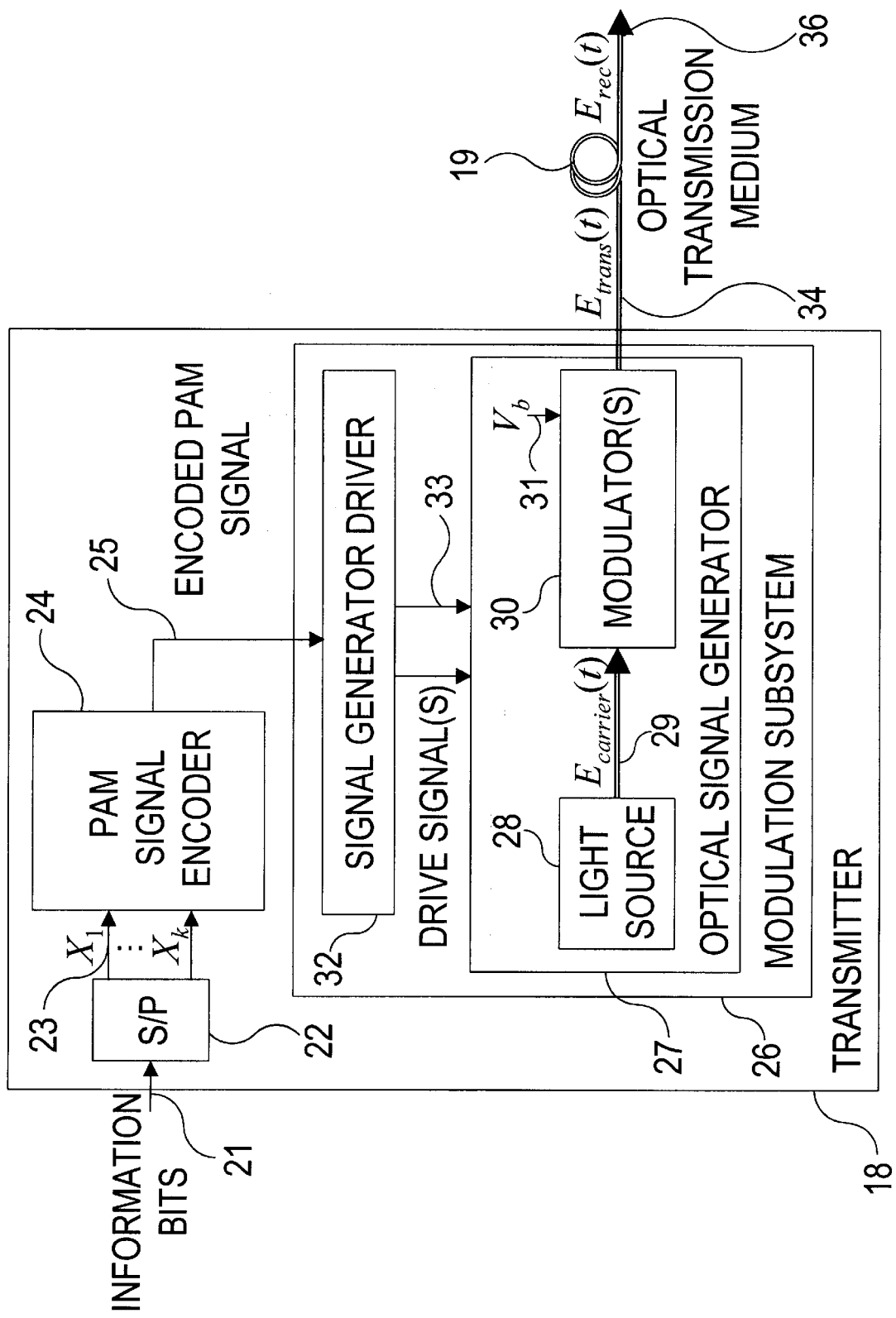
FIG. 2 is a block diagram of a duobinary M-ary pulse-amplitude modulation transmitter of the present invention.

FIG. 2 is a block diagram of the duobinary M-ary pulse-amplitude modulation transmitter of the present invention, referred to by the general reference number 18. Information bits 21 to be transmitted, if in serial form, are passed to a serial-to-parallel converter 22, which forms parallel blocks of k bits, denoted by 23. Alternatively, if information bits are already in the form of parallel blocks 23, the serial-to-parallel converter 22 may be omitted. Throughout this patent, the term "information bits" denotes the bits that are presented to the transmitter 18 to be encoded into an optical signal. These information bits 21 may directly correspond to the output(s) of one or more information sources. Alternatively, these information bits may have been scrambled, encoded (either by a line coder or error-correction coder) or otherwise modified prior to being presented to the transmitter 18. A pulse-amplitude modulation signal encoder 24 includes a M-ary pulse-amplitude modulation symbol encoder, a subsequence decomposer, a set of precoders, a set of duobinary filters, a summer, and a lowpass filter. All of these components within 24 may be implemented using an appropriate combination of special purpose hardware and general-purpose hardware, the latter in conjunction with the appropriate software. As described in detail below, in some embodiments of the invention, the order of one or more of these components may be interchanged, one or more of these components may be omitted, one or more of these components may be combined into a single element, or one or more of these component may be included implicitly in a component not contained in 24. For the purposes of making clear the general nature of the invention, we will describe the functions performed by these components assuming they are all present in 24 in separate, explicit form. Within 24, the M-ary pulse-amplitude modulation symbol encoder encodes each block of k information bits into a pulse-amplitude modulation symbol taking on one of M levels, where $M \geq 2$. The number of levels, M, must satisfy $M \geq 2^k$, with $M=2^k$ being encountered most often in practice. The duration of each symbol interval is T. The sequence of M-ary pulse-amplitude modulation symbols passes into a subsequence decomposer, which forms a set of M−1 subsequences. Each of these subsequences is a binary sequence having symbol interval T, and each is associated with one of M−1 levels of the M-ary pulse-amplitude modulation symbol sequence. Specifically, during each symbol interval, a given subsequence takes on a logical 0 unless the M-ary pulse-amplitude modulation symbol sequence takes on the corresponding level, in which case, that subsequence takes on a logical 1. We note that there is no subsequence associated with one of the levels of the M-ary pulse-amplitude modulation symbol sequence. We further note that during a given symbol interval, at most one of these M−1 subsequences takes on a logical 1. Each of the subsequences is input to a precoder, which precodes the subsequence so that at the receiver, the transmitted information bits can be recovered from the received optical signal using symbol-by-symbol detection on a signal proportional to the received optical intensity, e.g., by using a simple direct-detection receiver, without the potential for error propagation. Each of the precoded subsequences is input to a duobinary filter, which introduces temporal correlation for the purpose of narrowing the spectrum of the transmitted optical signal. We note that during a given symbol interval, at most one of the M−1 duobinary, precoded subsequences is nonzero. A summer forms a weighted sum of the duobinary, precoded subsequences. The summer output is a duobinary precoded pulse-amplitude modulation symbol sequence, which takes on a set of 2M−1 levels. The duobinary precoded pulse-amplitude modulation symbol sequence is fed into a lowpass filter, which further narrows the spectrum of the duobinary precoded pulse-amplitude modulation symbol sequence, yielding the duobinary pre-coded pulse-amplitude modulation signal. While all of the embodiments of the invention described here explicitly describe the use of one or more lowpass filter(s), it should be emphasized that this(these) filter(s) may be implicitly included in one or more elements of the transmitter.

The output of the encoder 24 comprises a encoded pulse-amplitude modulation signal 25 that conveys the duobinary precoded pulse-amplitude modulation signal.

Throughout this patent, we will describe optical signals in terms of their electric fields and their intensities (i.e., instantaneous powers). To define our notation, we consider an abstract optical signal X. In reality, the electric field of X is a real, passband signal at an optical carrier frequency $\omega_o$. We denote this real, passband electric field by $E_{X,rp}(t)$:

$$E_{X,rp}(t)=E_X(t)\cos(\omega_o t+\phi_o+\phi_X(t)),$$

where $\phi_o$, is the real optical carrier phase, and where $E_X(t)$ and $\phi_X(t)$ are the real, non-negative magnitude and the real phase of the optical signal X, respectively. We will find it convenient to represent the optical signal X by a complex, baseband electric field $E_{X,cb}(t)$:

$$E_{X,cb}(t)=E_X(t)e^{j\phi_X(t)}.$$

Note that the complex, baseband electric field $E_{X,cb}(t)$ completely describes the modulation impressed on the signal X (in the form of $E_X(t)$ and $\phi_X(t)$), but does not describe the carrier frequency $\omega_o$, nor the carrier phase $\phi_o$. Given $E_{X,cb}(t)$, the carrier frequency $\omega_o$ and the carrier phase $\phi_0$, we can recover $E_{X,rp}(t)$ as follows:

$$E_{X,rp}(t)=\mathrm{Re}[E_{X,cb}(t)e^{j(\omega t+\phi o)}].$$

In this patent, we will frequently consider an optical signal X such that $E_{X,cb}(t)$ takes on real values that are zero, positive or negative. Note that when $E_{X,cb}(t)$ is positive, then $\phi_X(t)=0$ (alternatively, we can say that $\phi_X(t)$ is equal to any even integral multiple of $\pi$). When $E_{X,cb}(t)$ is negative, then $\phi_X(t)=\pi$ (alternatively, we can say that $\phi_X(t)$ is equal to any odd integral multiple of $\pi$, such as $-\pi$). Given $E_{X,cb}(t)$, we can compute the intensity of the optical signal X:

$$I_X(t)=|E_{X,cb}(t)|^2.$$

Hereafter in this patent, we will always refer to the electric field of an optical signal X in terms of the complex, baseband electric field $E_{X,cb}(t)$, and we will omit the subscript "cb".

The encoded pulse-amplitude modulation signal 25 is input to a modulation subsystem 26, which modulates 25 onto an optical carrier electric field. The modulation subsystem 26 includes an optical signal generator 27. Within 27, a laser or other light; source 28 generates an optical carrier described by an optical carrier electric field $E_{carrier}(t)$, denoted by 29. The optical carrier electric field 29 is passed into one or more modulator(s) 30, which are biased by one or more suitable d.c. bias signals 31. Within 26, the encoded pulse-amplitude modulation signal 25 is passed to a signal generator driver 32, which may include one or more element(s) to process the signal 25, as well as one or more driver(s) to generate drive signal(s) 33. The drive signal(s) 33 is(are) passed into the optical signal generator 27, where 33 drive(s) the modulator(s) 30. In some embodiments, 33 also drives the light source 28. The encoded pulse-amplitude modulation signal 25 is thereby modulated onto the optical carrier electric field 29, yielding a transmitted optical electric field $E_{trans}(t)$ denoted by 34.

The transmitted optical electric field 34 can be described as a duobinary M-ary pulse-amplitude-modulated optical signal, which can be described in terms of a sequence of encoded symbols, each having interval T. In the present invention, the symbol interval T is longer than the symbol interval in systems using 2-ary pulse-amplitude modulation or duobinary 2-ary pulse-amplitude modulation by a factor $\log_2 M$, assuming $M=2^k$. For example, when $M=4$, the symbol interval is lengthened by a factor of 2.

During a given symbol interval, the transmitted optical electric field 34 takes on one of a set of $2M-1$ levels, which we denote as $\{E^{(i)}, i=-(M-1), \ldots, 0, \ldots, M-1\}$. This set of levels includes one level that is nominally zero, $E^{(0)} \approx 0$, which may be nonzero in practice because of a finite extinction ratio in the optical modulator(s), and/or because of imperfections in the modulator d.c. bias 31 and/or the drive signal(s) 33. The set of levels taken on by the transmitted optical electric field 34 includes a set of $M-1$ positive levels $\{E^{(i)}>0, i=1, \ldots, M-1\}$, and a set of $M-1$ negative levels $\{E^{(i)} \approx -E^{(-i)}<0, i=-(M-1), \ldots, -1\}$ which are, respectively, approximately the negatives of the positive levels. We recall that the transmitted optical intensity $I_{trans}(t)$ is given by the absolute square of the transmitted optical electric field 34, i.e., $I_{trans}(t)=|E_{trans}(t)|^2$. Hence, during a given symbol interval, the transmitted optical intensity $I_{trans}(t)$ takes on one of a set of M non-negative levels, which we denote as $\{I^{(i)}, i=0, \ldots, M-1\}$, where one of the levels is nominally zero $I^{(0)}=|E^{(0)}|^2 \approx 0$, and where the remaining non-zero levels are given by $I^{(i)}=|E^{(i)}|^2>0, i=1, \ldots, M-1$. For example, if the transmitted optical electric field 34 takes on the levels $\{-\sqrt{3},-\sqrt{2},-1,0,1,\sqrt{2},\sqrt{3}\}$, then the transmitted optical intensity $I_{trans}(t)$ takes on the levels $\{0, 1, 2, 3\}$.

The optical spectrum of the transmitted optical electric field 34 depends on the temporal correlation properties of the duobinary precoded pulse-amplitude modulation symbol sequence, which depends on the design of the PAM encoder 24, including the symbol encoder, the weights with which the duobinary precoded subsequences are summed, and the lowpass filter. The optical spectrum depends on the design of the modulation subsystem 26. Accordingly, the optical spectrum is different for the various embodiments of the invention described below. Nonetheless, for all of the embodiments of duobinary M-ary pulse-amplitude modulation following the present invention, the optical spectrum is narrowed by a factor of approximately 2 as compared to M-ary pulse-amplitude modulation, by a factor of approximately $\log_2 M$ as compared to duobinary 2-ary pulse-amplitude modulation, and by a factor of approximately $2\log_2 M$ as compared to 2-ary pulse-amplitude modulation (on-off keying).

We note that the block diagram 18 is representative of most, but not all, embodiments of a duobinary M-ary pulse-amplitude modulation transmitter following the present invention. Below, we will describe one embodiment that differs slightly from 18 in that the duobinary filtering function is performed in the modulation subsystem 26, rather than in 24.

The transmitted optical electric field 34 is launched into the optical transmission medium 19, which may be a fiber or free-space optical medium. In the former case, the optical transmission medium 19 may include single- and/or multi-mode fiber, one or more optical amplifier(s), one or more optical multiplexer(s) and/or demultiplexer(s), and one or more optical filter(s). If present, some of these optical components, such as multiplexers or filters, may serve to further narrow the optical spectrum of the transmitted optical signal. The output of the optical transmission medium 19 is a received optical electric field $E_{rec}(t)$, denoted by 36. We recall that the received optical intensity is given by $I_{rec}(t)=|E_{rec}(t)|^2$.

FIGS. 3a, 3b, and 3c are block diagrams of embodiments of receivers for duobinary M-ary pulse-amplitude-modulated optical signals of the present invention. Each of these receivers extracts from the received optical electric field 36 an electrical signal that is proportional to the received optical intensity $I_{rec}(t)$ and performs M-ary symbol-by-symbol decisions to recover the transmitted information bits, without the potential for error propagation.

FIG. 3a is a block diagram of a direct-detection receiver for duobinary M-ary pulse-amplitude-modulated optical signals of the present invention, and is referred to by a general reference number 20a. The optical electric field 36 illuminates a photodetector 40, such as a positive-intrinsic-negative photodiode or an avalanche photodiode, and produces a photocurrent i(t), denoted by 41. The photocurrent 41 is proportional to the received optical intensity $I_{rec}(t)$, and hence the photocurrent 41 can be described as a M-level pulse-amplitude modulation signal. The photocurrent 41 is passed into a block 42, which includes a preamplifier to amplify the photocurrent 41 and a lowpass filter to reduce noise and to shape the received pulses. In practice, the lowpass filter may not be present as a separate element, but may be included in the preamplifier. The output of the block 42 is a M-level pulse-amplitude modulation signal v(t), denoted by 43. The M-level pulse-amplitude modulation signal 43 is passed to a M-ary pulse-amplitude modulation decision device 44, which performs M-ary symbol-by-symbol decisions, e.g., by comparing the M-level pulse-amplitude modulation signal 43 to a set of $M-1$ thresholds. We note that because the M-ary pulse-amplitude modulation decision device 44 does not perform decisions by comparing values of the M-level pulse-amplitude modulation signal 43 in successive symbol intervals, decisions made by 44 are not subject to error propagation. A timing recovery device 45 generates a recovered clock signal that is used to clock the M-ary pulse-amplitude modulation decision device 44. The timing recovery device 45 may obtain its input from the M-ary pulse-amplitude modulation decision device 44, as shown in FIG. 3a or, alternatively, may obtain its input directly from the M-level pulse-amplitude modulation signal 43. The M-ary pulse-amplitude modulation decision device 44 yields at its output a block of k recovered information bits, denoted by 46. A parallel-to-serial converter 47 yields at its output the recovered information bits in a serial stream of recovered information bits 50.

FIG. 3b is a block diagram of an asynchronous homodyne receiver for duobinary M-ary pulse-amplitude-modulated optical signals of the present invention, and is referred to by a general reference number 20b. The asynchronous homodyne receiver 20b may be referred to variously as a phase-diversity homodyne receiver, a non-coherent homodyne receiver, or an incoherent homodyne receiver. The asynchronous homodyne receiver 20b includes a local oscillator laser or other light source 52, which emits a local oscillator optical electric field $E_{lo}(t)$, denoted by 53, whose frequency, $\omega_{lo}$, is approximately equal to the frequency of the received optical electric field 36, which is $\omega_{rec}$. The received optical electric field 36 and the local oscillator optical electric field 53 are combined in a passive optical hybrid 54, whose four outputs comprise in-phase linear combinations $\frac{1}{2}[E_{rec}(t)+E_{lo}(t)]$ and $\frac{1}{2}[E_{rec}(t)-E_{lo}(t)]$, denoted by 55 and 56, respectively, and quadrature linear combinations $\frac{1}{2}[E_{rec}(t)+jE_{lo}(t)]$ and $\frac{1}{2}[E_{rec}(t)-jE_{lo}(t)]$, denoted by 57 and 58, respectively. In a practical implementation, an asynchronous homodyne receiver typically includes some means to match the polarizations of the received optical electric field 36 and the local oscillator optical electric field 53, but this polarization-matching means is omitted from FIG. 3b for simplicity. The four electric-field combinations 55, 56, 57, 58 pass to four photodetectors 60, 61, 62, 63, respectively. The photodetectors 60 and 61 issue in-phase photocurrents 64 and 65, respectively; and the photodetectors 62 and 63 issue quadrature photocurrents 66 and 67, respectively. The in-phase photocurrents 64 and 65 are fed into a subtraction device 70, while the quadrature photocurrents 66 and 67 are fed into a subtraction device 71. The subtraction devices 70 and 71 issue an in-phase difference current signal 72 and a quadrature difference current signal 73, respectively. The difference current signals 72 and 73 are passed into blocks 74 and 75, respectively, each of which includes a preamplifier and a lowpass electrical filter. The blocks 74 and 75 issue lowpass-filtered, preamplified difference current signals 76 and 77, respectively. The difference currents 76 and 77 pass into squarers 80 and 81, respectively. The squarers 80 and 81 issue squared, lowpass-filtered, preamplified difference current signals 82 and 83, respectively, which are summed in a summer 84. The asynchronous homodyne receiver 20b is, up to and including the summer 84, identical to asynchronous homodyne receivers that are employed for 2-ary pulse-amplitude modulation (on-off keying). It is well-known that the output of the summer 84 is a signal proportional to the received optical intensity $I_{rec}(t)=|E_{rec}(t)|^2$. Hence, in the present instance, the output of the summer 84 is the M-level pulse-amplitude modulation signal v(t), denoted by 43. The remainder of the asynchronous homodyne receiver of FIG. 3b, which acts upon the M-level pulse-amplitude modulation signal 43, is identical to the corresponding portion of the direct-detection receiver of FIG. 3a, and operates in an identical fashion to yield the recovered output information bits 50 without the potential for error propagation. The embodiment of the asynchronous homodyne receiver 20b shown in FIG. 3b is only one of many possible embodiments of an asynchronous homodyne receiver that generates a M-level pulse-amplitude modulation signal 43 that is proportional to the received optical intensity $I_{rec}(t)$ and performs symbol-by-symbol M-ary decisions to yield the recovered information bits 50.

FIG. 3c is a block diagram of an asynchronous heterodyne receiver for duobinary M-ary pulse-amplitude-modulated optical signals of the present invention, and is referred to by a general reference number 20c. The asynchronous heterodyne receiver 20c may be referred to variously as a non-coherent heterodyne receiver, or an incoherent heterodyne receiver, or simply a heterodyne receiver. The asynchronous heterodyne receiver 20c includes a local oscillator laser or other light source 86, which emits a local oscillator optical electric field $E_{lo}(t)$, denoted by 87, whose frequency, $\omega_{lo}$, is approximately equal to $\omega_{rec}+\omega_{rec}$ or $\omega_{rec}-\omega_{if}$ where $\omega_{rec}$ is the frequency of the received optical electric field 36, and where $\omega_{if}$ is a suitably chosen intermediate frequency. The received optical electric field 36 and the local oscillator optical electric field 87 are combined in a passive optical hybrid 90, whose two outputs are linear combinations $1/\sqrt{2}[E_{rec}(t)+E_{lo}(t)]$ and $1/\sqrt{2}[E_{rec}(t)-E_{lo}(t)]$, denoted by 91 and 92, respectively. In a practical implementation, an asynchronous heterodyne receiver typically includes some means to match the polarizations of the received optical electric field 36 and the local oscillator optical electric field 87, but this polarization-matching means is omitted from FIG. 3c for simplicity. The electric-field combinations 91 and 92 illuminate photodetectors 93 and 94, respectively, whose outputs are photocurrents 95 and 96, respectively. The photocurrents 95 and 96 are fed to a subtraction device 97, whose output is a difference current signal 100. The difference current signal 100 contains desired components at the intermediate frequency $\omega_{if}$, as well as undesired components at baseband. The difference current signal 100 is fed to a block 101, which contains a preamplifier and a bandpass electrical filter, centered at the intermediate frequency $\omega_{if}$, which serves to removed the undesired baseband components. The output of 101 is an intermediate-frequency signal 102, which is fed to a squarer 103. The squarer 103 issues an output signal 104 having desired components at baseband and undesired components at $2\omega_{if}$, which is twice the intermediate frequency. While 103 is a squarer in the embodiment shown in FIG. 3c, we note that 103 can be replaced by any nonlinear device whose output includes the desired baseband components. The output signal 104 is passed to a lowpass electrical filter 105, which rejects the undesired components and passes only the desired baseband components. The asynchronous heterodyne receiver 20c is, up to and including the lowpass electrical filter 105, identical to asynchronous heterodyne receivers that are employed for 2-ary pulse-amplitude modulation (on-off keying). It is well-known that the output of the lowpass electrical filter 105 is a signal proportional to the received optical intensity $I_{rec}(t)=|E_{rec}(t)|^2$. Hence, in the present instance, the output of the lowpass electrical filter 105 is the M-level pulse-amplitude modulation signal v(t), denoted by 43. The remainder of the asynchronous heterodyne receiver of FIG. 3c, which acts upon the M-level pulse-amplitude modulation signal 43, is identical to the corresponding portion of the direct-detection receiver of FIG. 3a, and operates in an identical fashion to yield the recovered information bits 50 without the potential for error propagation. The embodiment of the asynchronous heterodyne receiver 20c shown in FIG. 3c is only one of many possible embodiments of an asynchronous heterodyne receiver that generates the M-level pulse-amplitude modulation signal 43 that is proportional to the received optical intensity $I_{rec}(t)$ and performs symbol-by-symbol M-ary decisions to yield the recovered, information bits 50 as an output.

As we have seen, each of the three receiver embodiments 20a, 20b and 20c, extracts from the received optical electric field 36 the M-level pulse-amplitude modulation signal 43 that is proportional to the received optical intensity $I_{rec}(t)=|E_{rec}(t)|^2$. In other words, the M-level pulse-amplitude modulation signal 43 is essentially equivalent in each of the three receiver embodiments 20a, 20b and 20c. Having extracted the M-level pulse-amplitude modulation signal 43, each of the three receiver embodiments 20a, 20b and 20c acts in an identical fashion to perform symbol-by-symbol M-ary decisions to yield the recovered information bits 50, without the potential for error propagation.

We will now describe in detail various embodiments of the duobinary M-ary pulse-amplitude modulation transmitter 18, including various embodiments of 24 and various embodiments of 26. For these various embodiments of the transmitter 18, we will describe the transmitted optical electric field 34, the received optical electric field 36 and the M-level pulse-amplitude modulation signal 43; and we will describe how the M-ary pulse-amplitude modulation decision device 44 can make symbol-by-symbol M-ary decisions to obtain the recovered information bits 50 without potential error propagation.

In the present invention, as stated previously, we encode information bits to be transmitted in a set of M−1 duobinary, precoded subsequences. We then form a weighted sum of the M−1 duobinary, precoded subsequences, lowpass filter this weighted sum to obtain a duobinary precoded M-ary pulse-amplitude modulation signal, and modulate the duobinary precoded M-ary pulse-amplitude modulation signal onto an optical carrier to obtain a duobinary M-ary pulse-amplitude-modulated optical signal. We will consider some embodiments of the invention in which we encode the information bits to be transmitted in a M-ary pulse-amplitude modulation symbol sequence as an intermediate step, prior to forming the M−1 duobinary, precoded subsequences. We will also consider embodiments of the invention in which we avoid performing this intermediate step.

We begin by describing an embodiment of the invention in which we encode the information bits to be transmitted in a M-ary pulse-amplitude modulation symbol sequence as an intermediate step, prior to forming the M−1 duobinary, precoded subsequences. FIG. 4a is a block diagram of an embodiment of a duobinary M-ary pulse-amplitude modulation signal encoder of the present invention, referred to by a general reference number 150. Information bits 21 to be transmitted, if in serial form, are passed to the serial-to-parallel converter 22, which forms parallel blocks of k bits, denoted by 23. Alternatively, if information bits are already in the form of parallel blocks 23, the serial-to-parallel converter 22 may be omitted. The blocks of k information bits 23 are input to the pulse-amplitude modulation signal encoder 24, which corresponds to 24 in FIG. 2. The encoder 24 includes a subsequence encoder 151, as well as some additional elements. The subsequence encoder 151 includes a M-ary pulse-amplitude modulation symbol encoder 152 and a subsequence decomposer 153. Inside of the subsequence encoder 151, the blocks of k information bits 23 enter the M-ary pulse-amplitude modulation symbol encoder 152, which encodes each block of k information bits into a pulse-amplitude modulation symbol taking on one of M levels $D^{(0)}, \ldots, D^{(M-1)}$, where $M \geq 2$. The number of levels, M, must satisfy $M \geq 2^k$, with $M=2^k$ being encountered most often in practice. In some cases, it may be desirable for the encoder 152 to perform this encoding using Gray coding, i.e., so that blocks of k information bits 23 encoded into symbols corresponding to adjacent levels in the transmitted optical intensity $I_{trans}(t)$ differ by only one information bit. Gray coding insures that at the receiver, the most likely M-ary symbol-decision errors result in only one information bit error. After we have further described the design of the encoder 150, we will explain how the design of the M-ary pulse-amplitude modulation symbol encoder 152 to implement Gray coding depends on the design of other elements within 150. The output of the encoder 152 is a M-ary pulse-amplitude modulation symbol sequence $D_m$, denoted by 154. In the sequence 154, each symbol has interval T. and m is a time index counting symbol intervals. The M-ary pulse-amplitude modulation symbol sequence 154 is input to the subsequence decomposer 153, which forms a set of M−1 logical subsequences, $S_{m,1}$ (denoted by 155a) through $S_{m,M-1}$ (denoted by 155b). Each of the logical subsequences is a binary sequence having symbol interval T. and each is associated with one of the M−1 levels $D^{(1)}$ through $D^{(M-1)}$. Note that there is no subsequence associated with the level $D^{(0)}$. During each symbol interval, a given logical subsequence takes on a logical 0 unless the M-ary pulse-amplitude modulation symbol sequence takes on the corresponding level, in which case, that subsequence takes on a logical 1. To describe these logical subsequences mathematically: during the mth symbol interval, for $i=1, \ldots, M-1$, $S_{m,i}=1$ if $D_m=D^{(i)}$ and $S_{m,i}=0$ if $D_m \neq D^{(i)}$. Note that during a given symbol interval, at most one of the logical subsequences takes on a logical 1. The subsequences 155a through 155b comprise the outputs of the subsequence encoder 151.

The M−1 logical subsequences 155a through 155b are received by a subsequence composer 156, which includes several elements, as described below. Inside of the subsequence composer 156, the subsequences 155a through 155b are received by M−1 logical subsequence precoders, respectively, each of which is denoted by 157. Each precoder 157 includes an exclusive-OR gate 158 (note than an exclusive-OR gate is equivalent to a modulo-2 adder or modulo-2 subtractor) having an inverter on one input, and a one-symbol delay 159 interconnected in a feedback arrangement. The M−1 logical subsequence precoders 157 issue logical precoded subsequences $P_{m,1}$ (denoted by 160) through $P_{m,M-1}$ (denoted by 161), respectively. The logical precoded subsequences 160 through 161 are related to the logical subsequences 155a through 155b, respectively, by the rule that, during the mth symbol interval, for $i=1, \ldots, M-1$, $P_{m,i} = \overline{S}_{m,i} - P_{m-1,i} \pmod 2$, where $\overline{S}_{m,i}$ is the complement of the ith logical subsequence $S_{m,i}$ in the mth symbol interval, and where $P_{m-1,i}$ is the ith logical precoded subsequence during the previous symbol interval, m−1. The precoding performed by the precoders 157 makes it possible for a receiver to recover the information bits by making M-ary symbol-by-symbol decisions on a signal proportional to the received optical intensity, without the potential for error propagation. While we have described here an implementation of the precoders 157 based on exclusive-OR gates 158, it is possible to implement equivalent precoders using other logical gates to perform the function of "comparing" delayed copies of 160. through 161 to 155a through 155b, respectively.

The logical precoded subsequences 160 through 161 are passed to M−1 level shifters, each of which is labeled "L/S" and denoted by 162. Each of the level shifters 162 converts a logical input signal (taking on levels corresponding to logical 0 or logical 1, respectively) to a bipolar input signal (taking on equal and opposite levels, e.g., −1 or 1, respectively). In a practical embodiment of the invention, the level shifters 162 may simply correspond to an a.c.-coupling device, e.g., coupling capacitor. The M−1 level shifters 162 issue bipolar precoded subsequences $I_{m,1}$ (denoted by 163) through $I_{m,M-1}$ (denoted by 164), respectively. These bipolar precoded subsequences 163 through 164 are related to the logical precoded subsequences 160 through 161, respectively, according to the rule that, during the mth symbol interval, for $i=1, \ldots, M-1$, $I_{m,i}=1$ if $P_{m,i}=1$ and $I_{m,i}=-1$ if $P_{m,i}=0$.

The M−1 bipolar precoded subsequences 163 through 164 are received by M−1 duobinary filters 165, respectively. Each duobinary filter 165 includes a one-symbol delay 166 and a summer 167 interconnected in a delay-and-add configuration. The M−1 duobinary filters 165 issue duobinary precoded subsequences $B_{m,1}$ (denoted by 170) through $B_{m,M-1}$ (denoted by 171), respectively. These duobinary precoded subsequences 170 through 171 are related to the bipolar precoded subsequences 163 through 164, respectively, by the rule that, during the mth symbol interval, for $i=1, \ldots, M-1$, $B_{m,i}=I_{m,i}+I_{m-1,i}$, where $I_{m-1,i}$ is the ith bipolar precoded subsequence during the previous symbol interval, m−1. In other words, each duobinary filter forms the running sum of its input values during two consecutive symbol intervals, for the purpose of introducing correlation, which results in a narrowing of the optical spectrum of the transmitted optical signal. Note that, during each symbol interval, each of the duobinary precoded subsequences 170 through 171 takes on a level that is either 2, 0 or −2. However, during a given symbol interval, at most one of the duobinary precoded subsequences 170 through 171 takes on a nonzero level.

The encoder 150 incorporates a set of M−1 amplifiers having gains $G_1$ through $G_{M-1}$, denoted by 172 through 173, respectively. The duobinary precoded subsequences 170 through 171 are weighted by the amplifiers 172 through 173, respectively, resulting in M−1 signals denoted 174 through 175, respectively. The M−1 signals 174 through 175 are input to a summer 176, whose output is a duobinary precoded pulse-amplitude modulation symbol sequence $B_m$, denoted by 177. The sequence 177 is a weighted sum of the sequences 170 through 171, i.e., $$B_m = \sum_{i=1}^{M-1} G_i B_{m,i}.$$

Note that the duobinary precoded pulse-amplitude modulation symbol sequence $B_m$, denoted by 177, takes on 2M−1 levels, including 0, the M−1 positive levels $2G_1$ through $2G_{M-1}$, and the M−1 negative levels $-2G_1$ through $-2G_{M-1}$.

The sequence 177 passes into a lowpass filter 180, whose output is a duobinary precoded pulse-amplitude modulation signal s(t), denoted by 181. Note that 181 corresponds to 25 in FIG. 2. Since the lowpass filter 180 is a linear system, the levels taken on by the signal 181 are proportional to the levels taken on by the sequence 177. Although in the embodiment 150 we show the lowpass filter 180 as a separate component, in some embodiments, the lowpass filter may not be present as a separate component, and the lowpass filtering function may be performed by one or more other components in the duobinary M-ary pulse-amplitude modulation signal encoder or in the modulation subsystem that follows it.

In practice, the choice of the gains of the amplifiers 172 through 173, which determine the levels that are to be taken on by the sequence 177, and thus by the signal 181, depends on the characteristics of the modulation subsystem 26 used to modulate the signal 181 onto the optical carrier electric field 29 to produce the transmitted optical electric field 34, and also depends on the set of levels that are to be taken on by the transmitted optical electric field 34, and thus the transmitted optical intensity $I_{trans}(t)$. We will provide a detailed example after we have described the transfer characteristics of typical embodiments of the modulation subsystem 26.

As stated previously, in some cases, it may be desirable to design the encoder 150 to use Gray coding, i.e., so that blocks of k information bits 23 encoded into symbols corresponding to adjacent levels in the transmitted optical intensity $I_{trans}(t)$ differ by only one information bit. In general, given the characteristics of the modulation subsystem 26, implementation of Gray coding depends on the proper design of the encoder 152 and the proper choice of the gains of the amplifiers 172 through 173. To provide an example, suppose that the modulation subsystem 26 yields the transmitted electric field 34 that is a monotonic function of the encoded pulse-amplitude modulation signal 25, which corresponds to 181 in the present embodiment. Suppose that we choose $G_1$ through $G_{M-1}$, the gains of the amplifiers 172 through 173, to be monotonically increasing (i.e., $G_{M-1} > \ldots > G_1$). In this case, to implement Gray coding, we should design the encoder 152 so that blocks of k information bits 23 encoded into adjacent levels (e.g., $D^{(i)}$ and $D^{(i+1)}$) differ by only one information bit. We will provide a concrete example of implementation of Gray coding below.

We note that there are numerous ways to rearrange the elements of the encoder 150, especially the duobinary filters 165 and components following them, without altering the basic functionality of 150. For example, we can interchange each duobinary filter 165 with the corresponding amplifier (172 through 173). As another example, we can replace the set of M−1 duobinary filters 165 by a single duobinary filter placed at any location in the signal flow of 150 that is after the summer 176. In embodiments of a duobinary M-ary pulse-amplitude modulation signal encoder other than 150, which are described below, there are also numerous ways to rearrange the constituent parts without altering the basic functionality of the encoder.

We will now describe an embodiment of the invention in which we avoid the intermediate step of encoding the information bits to be transmitted in a M-ary pulse-amplitude modulation symbol sequence, prior to forming the M−1 duobinary, precoded subsequences. In order to most clearly illustrate how we can avoid this step, we consider a specific example in which k=2 and $M=2^k=4$. FIG. 4b is a block diagram of an embodiment of a duobinary 4-ary pulse-amplitude modulation signal encoder of the present invention, referred to by a general reference number 182. Information bits 21 to be transmitted, if in serial form, are passed to the serial-to-parallel converter 22, which forms parallel blocks of 2 bits $X_1$ and $X_2$, which are denoted by 183 and 184, respectively. Alternatively, if information bits are already in the form of parallel blocks of 2 bits, then the serial-to-parallel converter 22 may be omitted. Blocks of 2 information bits 183 and 184 are input to the pulse-amplitude modulation signal encoder 24, which corresponds to 24 in FIG. 2. The encoder 24 includes a subsequence encoder 151a, as well as some additional elements. The subsequence encoder 151a implements the same functions in the specific embodiment 182 as the subsequence encoder 151 implements in the more general embodiment 150. In other words, the subsequence encoder 151a encodes blocks of k=2 information bits in a set of M−1=3 logical subsequences. However, unlike 151, 151a avoids the intermediate step of encoding the information bits in a 4-ary pulse-amplitude modulation symbol sequence. The subsequence encoder 151a includes a subsequence decomposer 153a. Although the subsequence encoder 151a avoids the intermediate step of encoding the information bits in a 4-ary pulse-amplitude modulation symbol sequence, 151a (more specifically, the subsequence decomposer 153a within 151a) is designed with reference to a specific mapping between blocks of 2 information bits and 4-ary pulse-amplitude modulation symbols, which is shown in a table 1, below.

TABLE 1

| $X_1$ | $X_2$ | $D_m$ | $\overline{S}_{m,1}$ | $\overline{S}_{m,2}$ | $\overline{S}_{m,3}$ |
|---|---|---|---|---|---|
| 0 | 0 | $D^{(0)} = 0$ | 1 | 1 | 1 |
| 0 | 1 | $D^{(1)} = 1$ | 0 | 1 | 1 |
| 1 | 1 | $D^{(2)} = 2$ | 1 | 0 | 1 |
| 1 | 0 | $D^{(3)} = 3$ | 1 | 1 | 0 |

As we will see, this specific mapping implements Gray coding if we properly design some additional elements within the encoder 182 and the modulation subsystem 26. The subsequence decomposer 153a needs to form the logical subsequences $S_{m,1}$, $S_{m,2}$ and $S_{m,3}$, which take on a logical 1 for $D_m$=1, 2, and 3, respectively, and take on a logical 0 otherwise. Equivalently, 153a can form the complemented logical subsequences $\overline{S}_{m,1}$, $\overline{S}_{m,2}$ and $\overline{S}_{m,3}$, which are related to the information bits $X_1$ and $X_2$ as indicated in the table 1 above. The subsequence decomposer 153a includes three OR gates 186, 187 and 188 equipped with appropriate inverters at their inputs. The OR gates 186, 187 and 188 generate complemented logical subsequences $\overline{S}_{m,1}$ denoted by 190, $\overline{S}_{m,2}$ denoted by 191, and $\overline{S}_{m,3}$ denoted by 192, respectively. The subsequences 190, 191 and 192 comprise the outputs of the subsequence encoder 151a.

The subsequences 190, 191 and 192 are input to a subsequence composer 156a, which includes several elements, as described below. Inside of the subsequence composer 156a, the subsequences 190, 191 and 192 are received by three precoders, respectively, each denoted by 193. Each precoder 193 includes an exclusive-OR gate 195 and a one-symbol delay 196, interconnected in a feedback arrangement. The three precoders 193 issue respective logical precoded subsequences $P_{m,1}$ denoted by 200, $P_{m,2}$ denoted by 201, and $P_{m,3}$ denoted by 202. The logical precoded subsequences 200, 201 and 202 are related to the complemented logical subsequences 190, 191 and 192, respectively, by the rule that, during the mth symbol interval, for i=1,2,3, $P_{m,i} = \overline{S}_{m,i} - P_{m-1,i}$ (mod2). While we have described here an implementation of the precoders 193 based on exclusive-OR gates 195, it is possible to implement equivalent precoders using other logical gates to perform the function of "comparing" delayed copies of the logical precoded subsequences 200, 201 and 202 to the complemented logical subsequences 190, 191 and 192, respectively.

The remaining portion of the encoder 182 is analogous to the corresponding portion of the encoder 150 (note, however, that the encoder 150 is for arbitrary M≧2, whereas encoder 182 is specifically for M=4). The logical precoded subsequences 200, 201 and 202 pass to the three level shifters 162, respectively, each of which is labeled "L/S". The three level shifters 162 issue bipolar precoded subsequences $I_{m,1}$, $I_{m,2}$, and $I_{m,3}$, which are denoted by 203, 204 and 205, respectively. The bipolar precoded subsequences 203, 204 and 205 are related to the logical precoded subsequences 200, 201 and 202, respectively, by the rule that, during the mth symbol interval, for i=1,2,3, $I_{m,i}=1$ if $P_{m,i}=1$ and $I_{m,i}=-1$ if $P_{m,i}=0$. The three bipolar precoded subsequences 203, 204 and 205 pass to three duobinary filters, respectively, each of which is denoted by 165. Each of the respective duobinary filters 165 includes the one-symbol delay 166 and the summer 167 interconnected in a delay-and-add configuration. The three duobinary filters 165 issue respective duobinary precoded subsequences $B_{m,1}$, $B_{m,2}$ and, $B_{m,3}$, which are denoted by 206, 207 and 208, respectively. The duobinary precoded subsequences 206, 207 and 208 are related to the bipolar precoded subsequences 203, 204 and 205, respectively, by the rule that, during the mth symbol interval, for i=1,2,3, $B_{m,i}=I_{m,i}+I_{m-1,i}$. Note that, during each symbol interval, each of the duobinary precoded subsequences 206, 207 and 208 takes on a level that is either 2, 0 or −2.

However, during a given symbol interval, at most one of the duobinary precoded subsequences 206, 207 and 208 takes on a nonzero level. The encoder 182 incorporates a set of three amplifiers 210, 211 and 212 having gains $G_1$, $G_2$ and $G_3$, respectively, and the summer 176, whose output is a duobinary precoded pulse-amplitude modulation symbol sequence $B_m = G_1 B_{m,1} + G_2 B_{m,2} + G_3 B_{m,3}$, denoted by 177a. Note that 177a takes on 2M−1=7 levels, including 0, the M−1=3 positive levels $2G_1$, $2G_2$ and $2G_3$, and the M−1=3 negative levels $-2G_1$, $-2G_2$ and $-2G_3$. The sequence 177a passes into the lowpass filter 180, whose output is a duobinary precoded pulse-amplitude modulation signal s(t), denoted by 181a. Note that 181a corresponds to 25 in FIG. 2. Note also that the levels taken on by 181a are proportional to those taken on by 177a.

The choice of the gains $G_1$, $G_2$ and $G_3$ determine the levels that are to be taken on by the sequence 177a, and thus by the signal 181a. In practice, this choice depends on the characteristics of the modulation subsystem 26, and also depends on the set of levels that are to be taken on by the transmitted optical electric field 34, and thus the transmitted optical intensity $I_{trans}(t)$. We will provide an example of the choice of the gains $G_1$, $G_2$ and $G_3$ after we have described the transfer characteristics of typical embodiments of the modulation subsystem 26. Suppose that we choose the amplifier gains $G_1$, $G_2$ and $G_3$ to be monotonically increasing (i.e., $G_3 > G_2 > G_1$), and that the modulation subsystem 26 yields the transmitted electric field 34 that is a monotonic function of the encoded pulse-amplitude modulation signal 25, which corresponds to 181a in the present embodiment. In this case, the specific mapping between blocks of 2 information bits and 4-ary pulse-amplitude modulation symbols assumed in the design of 151a implements Gray coding. In other words, blocks of 2 information bits encoded into adjacent levels in the transmitted optical intensity $I_{trans}(t)$ differ by only one information bit.

We will now describe the transfer characteristics of typical embodiments of the modulation subsystem 26.

FIGS. 5a, 5b, 5c and 5d are block diagrams of embodiments of subsystems for modulating the signal 181, 181a onto the optical carrier electric field 29 to produce the transmitted optical electric field 34.

Figure 5A:
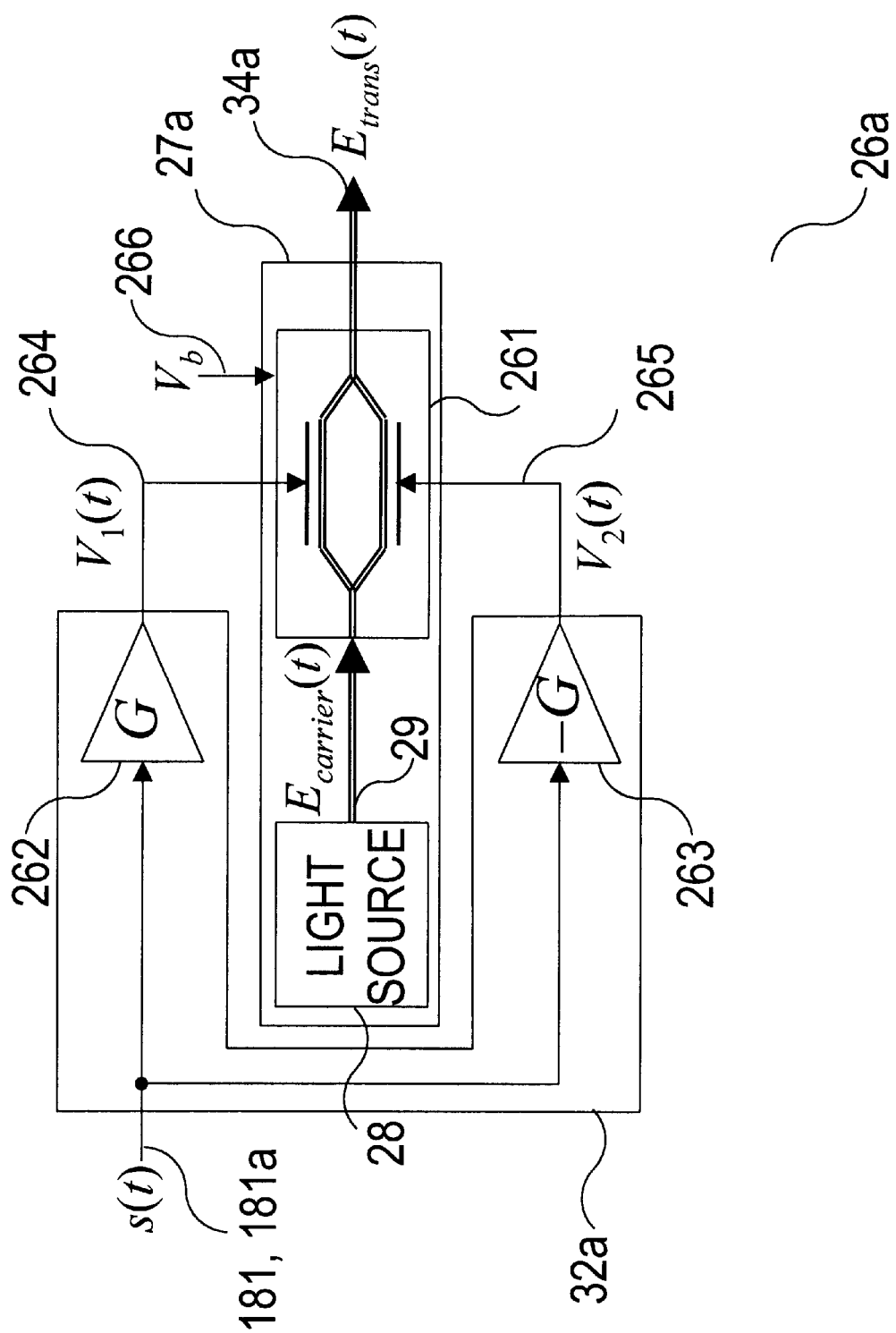

FIG. 5a is a modulation subsystem that uses an unmodulated laser, or other light source, and a dual-drive, push-pull, Mach-Zehnder interferometric intensity modulator, and is given a general reference number 26a. The modulation subsystem 26a includes an optical signal generator 27a and a signal generator driver 32a. Within 27a, a laser or other light source, designated by 28, generates an unmodulated optical carrier described by the optical carrier electric field $E_{carrier}(t)$, denoted by 29. The optical carrier electric field 29 is passed into a dual-drive, push-pull, Mach-Zehnder interferometric intensity modulator 261. Within 32a, the signal 181, 181a is passed to a driver amplifier 262, which has gain G, as well as a driver amplifier 263, which has gain −G. The outputs of 262 and 263 are complementary modulator drive signals $V_1(t)=Gs(t)$ and $V_2(t)=-Gs(t)$, which are denoted by 264 and 265, respectively. Note that 264 and 265 are equivalent to 33 in FIG. 2. The drive signals 264 and 265 are input to the modulator 261. The output of the modulator 261 is a transmitted optical electric field $E_{trans}(t)$, denoted by 34a. The modulator 261 is biased by a d.c. bias $V_b$, denoted by 266, which is chosen so that the transmitted optical electric field 34a is approximately zero when the signals $V_1(t)$ and $V_2(t)$ are zero.

Figure 5B:
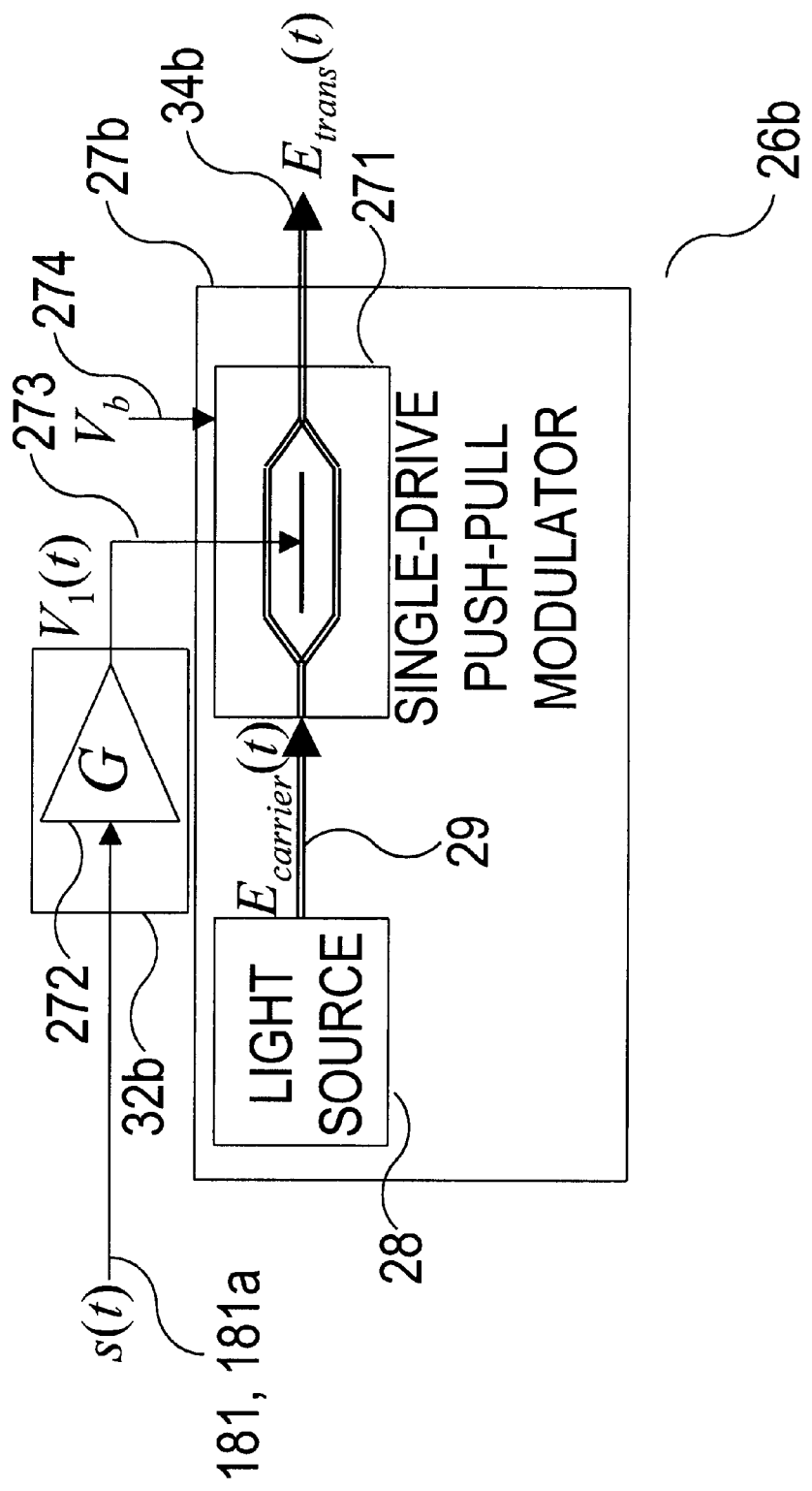

FIG. 5b is a modulation subsystem that uses an unmodulated laser, or other light source, and a single-drive, push-pull, Mach-Zehnder interferometric intensity modulator, and is given a general reference number 26b. The modulation subsystem 26b includes an optical signal generator 27b and a signal generator driver 32b. Within 27b, a laser or other light source, designated 28, generates an unmodulated optical carrier described by the optical carrier electric field $E_{carrier}(t)$, denoted by 29. The optical carrier electric field 29 is passed into a single-drive, push-pull, Mach-Zehnder interferometric intensity modulator 271. Within 32b, the signal 181, 181a is passed into a driver amplifier 272, which has gain G. The output of 272 is a modulator drive signal $V_1(t)=Gs(t)$, which is denoted by 273, and which is input to the modulator 271. Note that 273 is equivalent to 33 in FIG. 2. The output of the modulator 271 is a transmitted optical electric field $E_{trans}(t)$, denoted by 34b. The modulator 271 is biased by a d.c. bias $V_b$, denoted by 274, which is chosen so that the transmitted optical electric field 34b is approximately zero when the signal $V_1(t)$ is zero.

Figure 5C:
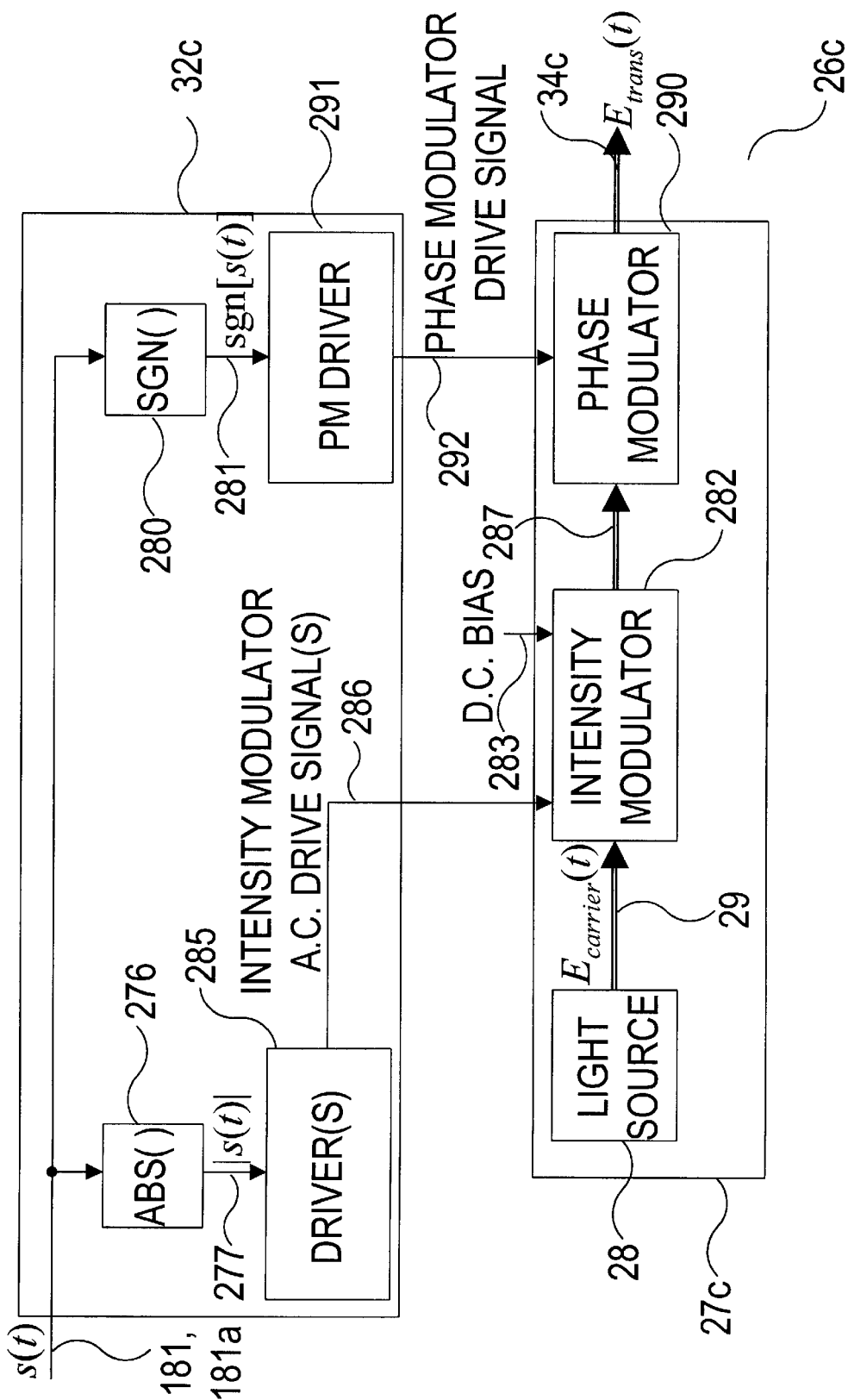

FIG. 5c is a modulation subsystem that uses an unmodulated laser, or other light source, an intensity modulator, and a phase modulator, and is given a general reference number 26c. The modulation subsystem 26c includes an optical signal generator 27c and a signal generator driver 32c. Within 32c, the signal s(t), denoted by 181, 181a is passed into a magnitude computing device 276, whose output 277 is proportional to |s(t)|, the magnitude of s(t). Within 32c, the signal 181, 181a is also fed into a sign computing device 280, whose output 281 is representative of sgn[s(t)], the sign of s(t). Within 27c, a laser or other light source, designated 28, generates an unmodulated optical carrier described as the optical carrier electric field $E_{carrier}(t)$ 29. The optical carrier electric field 29 is passed into an intensity modulator 282, which may be an interferometric intensity modulator, an electroabsorption intensity modulator, or may be of some other design. The intensity modulator 282 is biased by a suitable intensity modulator d.c. bias 283. Within 32c, the signal |s(t)|, denoted by 277, is passed into an intensity modulator driver 285, which generates one or more intensity modulator a.c. drive signal(s), denoted by 286. The drive signal(s) 286 drive(s) the intensity modulator 282, causing 282 to modulate 277 onto the optical carrier electric field 29, resulting in a modulated optical signal 287 at the output of 282. The modulated optical signal 287 is passed into a phase modulator 290. Within 32c, the signal sgn[s(t)], denoted by 281, is passed into a phase modulator driver 291, which generates a phase modulator drive signal 292. The drive signal 292 drives the phase modulator 290, causing 290 to modulate the sign of 287 by sgn[s(t)], denoted by 281, by selectively introducing phase shifts of n. Note that 286 and 292 are equivalent to 33 in FIG. 2. The output of the phase modulator 290 is a transmitted optical electric field $E_{trans}(t)$, denoted by 34c.

Figure 5D:
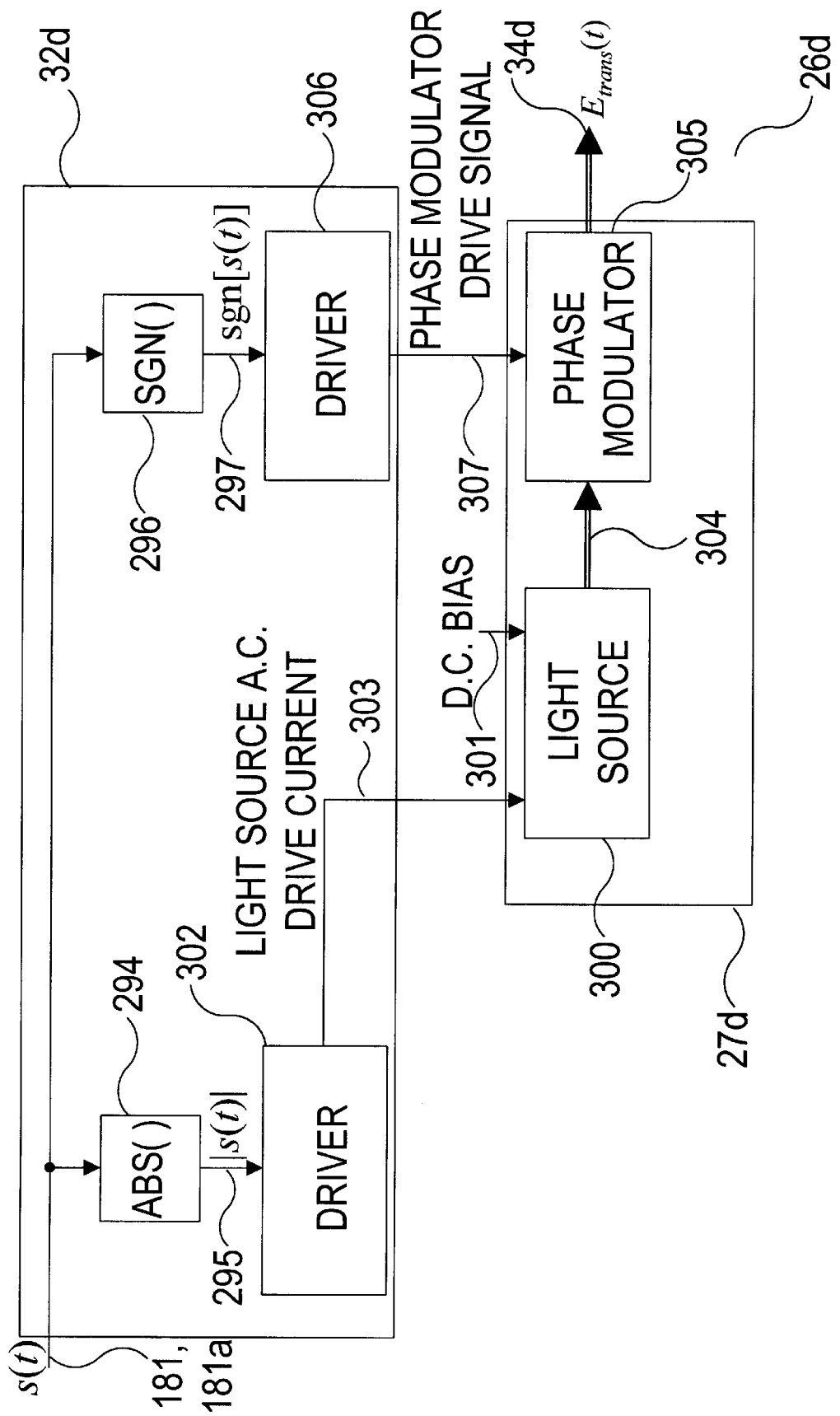

FIG. 5d is a modulation subsystem that uses a directly modulated laser, or other light source, an intensity modulator, and a phase modulator, and is given a general reference number 26d. The modulation subsystem 26d includes an optical signal generator 27d and a signal generator driver 32d. Within 32d, the signal s(t), denoted by 181, 181a is passed into a magnitude computing device 294, whose output 295 is proportional to |s(t)|, the magnitude of s(t). Within 32d, the signal 181, 181a is also fed into a sign computing device 296, whose output 297 is representative of sgn[s(t)], the sign of s(t). Within 27d, a laser, or other light source, designated 300, is biased by a suitable d.c. bias current 301. Within 32d, the signal |s(t)|, denoted by 295, is passed into a light source driver 302, which generates a light source a.c. drive current, denoted by 303. The drive current 303 drives 300, causing 300 to emit a modulated optical signal 304, whose amplitude is modulated by |s(t)|, denoted by 295. The modulated optical signal 304 is passed into a phase modulator 305. Within 32d, the signal sgn[s(t)], denoted by 297, is passed into a phase modulator driver 306, which generates a phase modulator drive signal 307. The drive signal 307 drives the phase modulator 305, causing 305 to modulate the sign of 304 by sgn[s(t)], denoted by 297, by selectively introducing phase shifts of n. Note that 303 and 307 are equivalent to 33 in FIG. 2. The output of the phase modulator 305 is a transmitted optical electric field $E_{trans}(t)$, denoted by 34d.

FIGS. 6a–6h are the input-output transfer characteristics of optical modulators used in embodiments of the present invention.

Figure 6A:
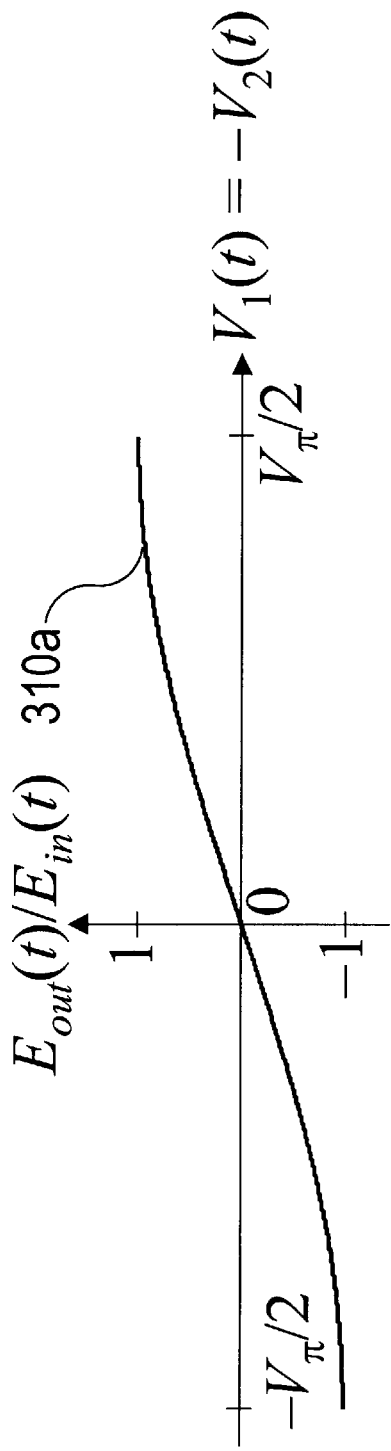
Figure 6B:
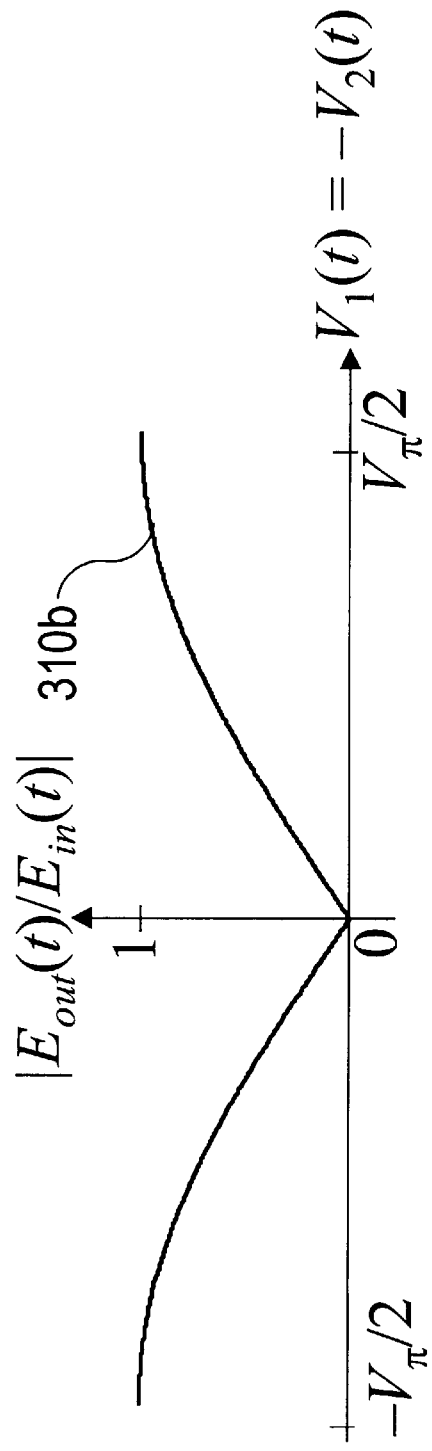
Figure 6C:
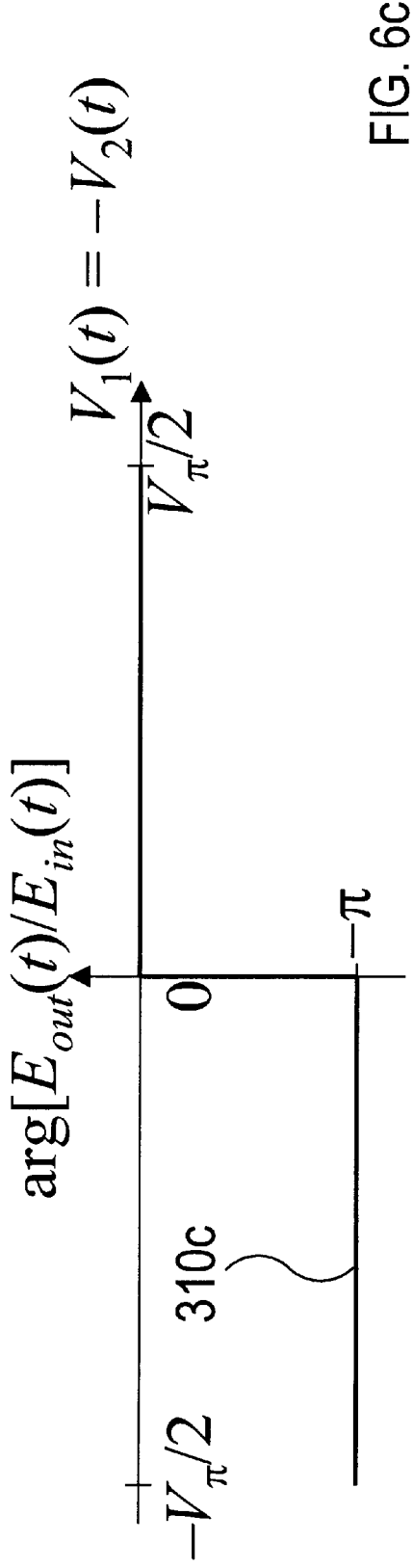

FIGS. 6a–6c present the input-output transfer characteristic of a dual-drive, push-pull, Mach-Zehnder interferometric intensity modulator, such as 261 in FIG. 5a. In FIGS. 6a–6c, $E_{in}(t)$ and $E_{out}(t)$ denote the optical electric fields at the modulator input and output, respectively, which correspond to 29 and 34a, respectively, in FIG. 5a. The transfer characteristic in FIGS. 6a–6c assumes that, as in the subsystem of FIG. 5a, the modulator is driven by complementary drive signals $V_1(t)$ and $V_2(t)=-V_1(t)$, and is biased by a d.c. bias $V_b$ such that $E_{out}(t)$ is approximately zero when $V_1(t)$ and $V_2(t)$ are zero. Ignoring the modulator insertion loss and a constant phase shift of the output electric field, the transfer characteristic of FIGS. 6a–6c is described by:

$$\frac{E_{out}(t)}{E_{in}(t)} = \sin\left(\pi\frac{V_1(t)}{V_\pi}\right),$$

where $V_\pi$ is the drive voltage required to cause a phase shift of π. In FIG. 6a, the modulator transfer characteristic is shown by a graph line 310a, which shows that $E_{out}(t)$ is modulated by positive values when $V_1(t)$ is positive, and by negative values when $V_1(t)$ is negative, provided that $V_1(t)$ lies within the range $[-V_\pi/2, V_\pi/2]$. In FIG. 6b, a graph line 310b shows the magnitude of the modulator transfer characteristic. In FIG. 6c, a graph line 310c shows the phase of the modulator transfer characteristic. Examining the graph line 310c, we see that $E_{out}(t)$ is subject to a phase shift of 0 when $V_1(t)$ is positive, and is subject to a phase shift of –π (which is equivalent to a phase shift of π) when $V_1(t)$ is negative, provided that $V_1(t)$ lies within the range $[-V_\pi/2, V_\pi/2]$.

Figure 6D:
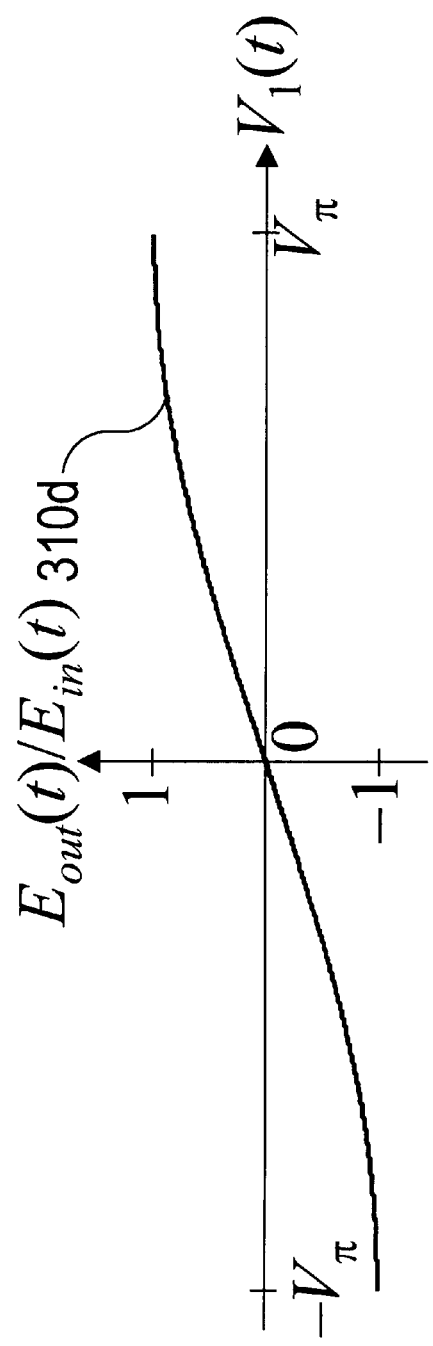
Figure 6E:
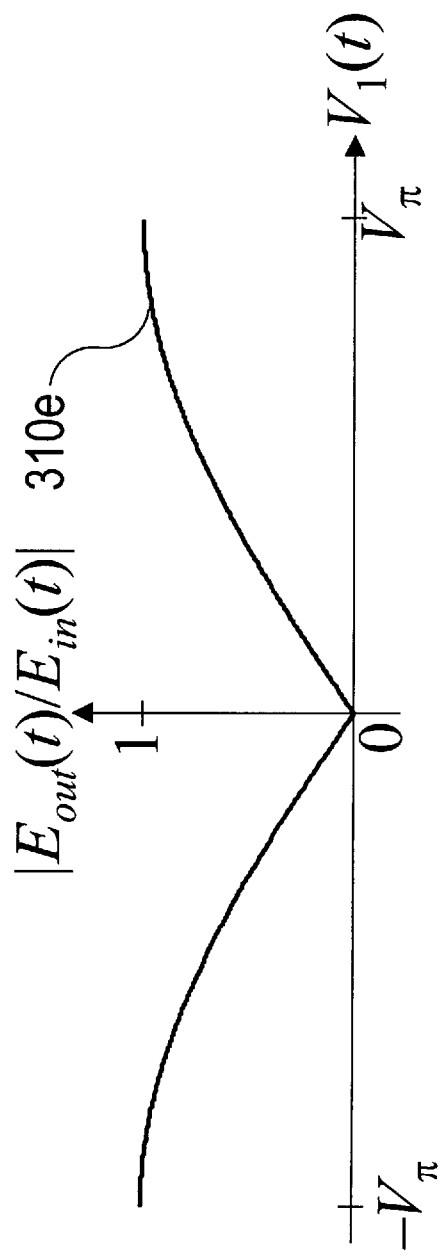
Figure 6F:
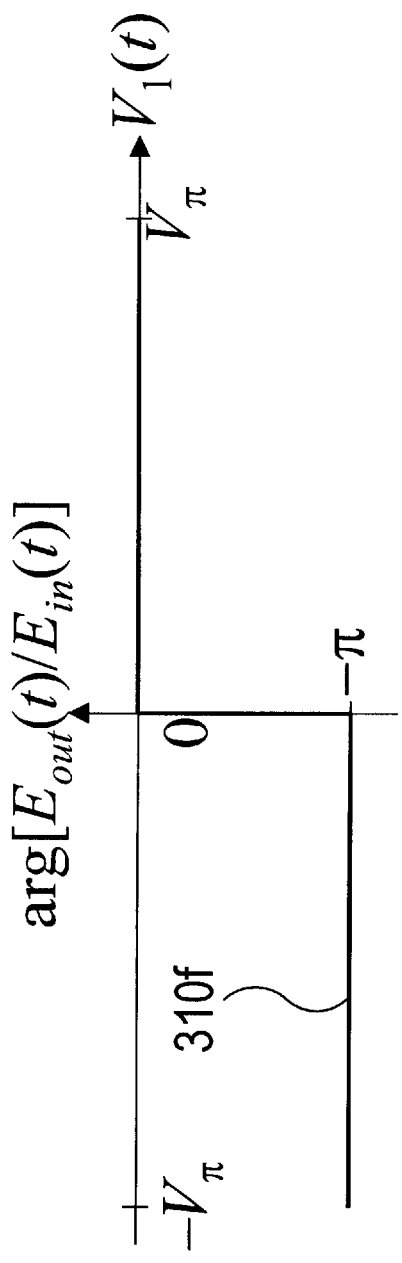

FIGS. 6d–6f present the input-output transfer characteristic of a single-drive, push-pull, Mach-Zehnder interferometric intensity modulator, such as 271 in FIG. 5b. In FIGS. 6d–6f, $E_{in}(t)$ and $E_{out}(t)$ denote the optical electric fields at the modulator input and output, respectively, which correspond to 29 and 34b, respectively, in FIG. 5b. The transfer characteristic in FIGS. 6d–6f assumes that, as in the subsystem of FIG. 5b, the modulator is driven by the drive signal $V_1(t)$, and is biased by a d.c. bias $V_b$ such that $E_{out}(t)$ is approximately zero when $V_1(t)$ is zero. Ignoring the modulator insertion loss and a constant phase shift of the output electric field, the transfer characteristic of FIGS. 6d–6f is described by:

$$\frac{E_{out}(t)}{E_{in}(t)} = \sin\left(\pi\frac{V_1(t)}{2V_\pi}\right),$$

where $V_\pi$ is the drive voltage required to cause a phase shift of π. In FIG. 6d, the modulator transfer characteristic is shown by a graph line 310d, which shows that $E_{out}(t)$ is modulated by positive values when $V_1(t)$ is positive, and by negative values when $V_1(t)$ is negative, provided that $V_1(t)$ lies within the range $[-V_\pi, V_\pi]$. In FIG. 6e, a graph line 310e shows the magnitude of the modulator transfer characteristic. In FIG. 6f, a graph line 310f shows the phase of the modulator transfer characteristic. Examining the graph line 310f, we see that $E_{out}(t)$ is subject to a phase shift of 0 when $V_1(t)$ is positive, and is subject to a phase shift of –π (which is equivalent to a phase shift of π) when $V_1(t)$ is negative, provided that $V_1(t)$ lies within the range $[-V_\pi, V_\pi]$.

Figure 6G:
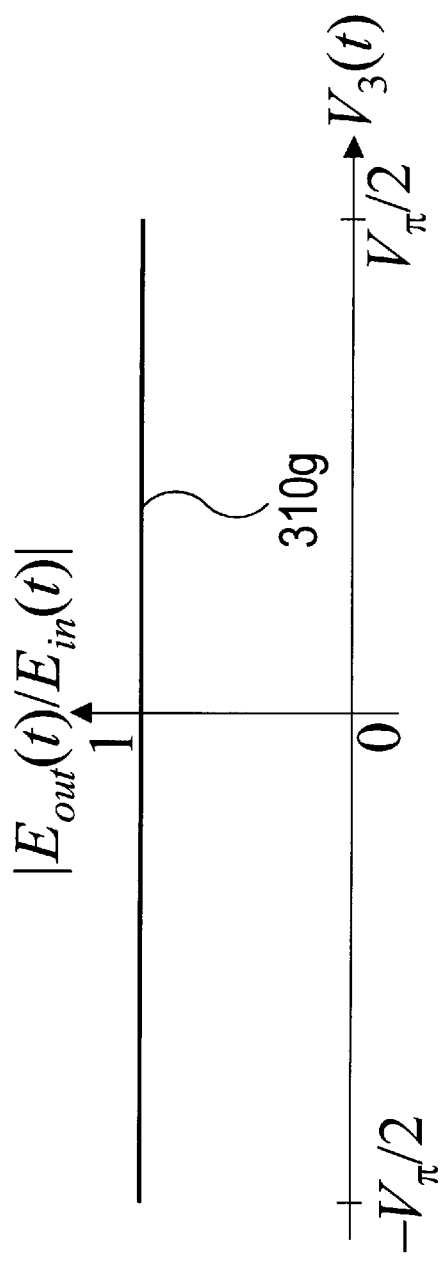
Figure 6H:
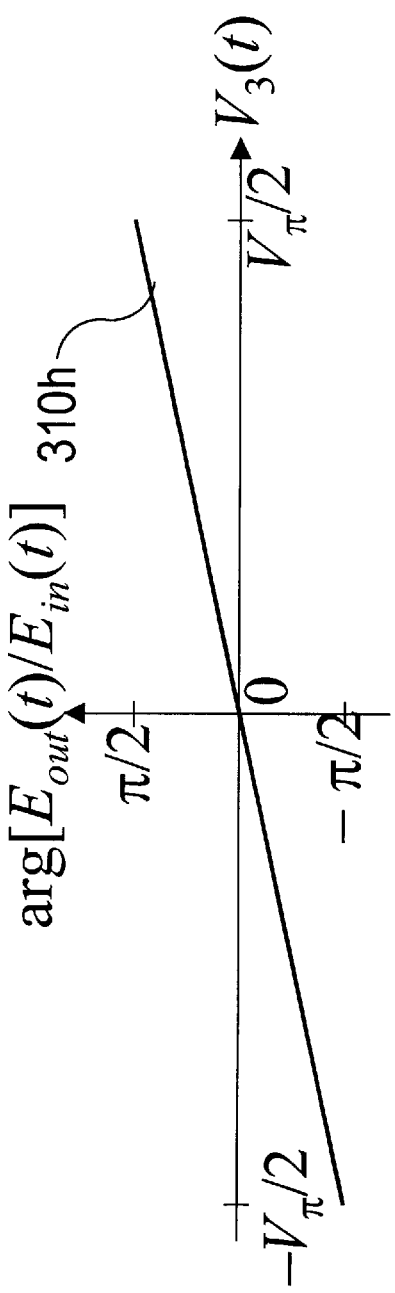

FIGS. 6g–6h present the input-output transfer characteristic of a phase modulator, such as 290 in FIG. 5c or 305 in FIG. 5d. In FIGS. 6g–6h, $E_{in}(t)$ denotes the optical electric field at the modulator input, which corresponds to 287 in FIG. 5c and 304 in FIG. 5d. $E_{out}(t)$ denotes the optical electric field at the modulator output, which corresponds to 34c in FIG. 5c and 34d in FIG. 5d. Ignoring the modulator insertion loss, the transfer characteristic of FIGS. 6g–6h is described by:

$$\frac{E_{out}(t)}{E_{in}(t)} = e^{j\pi \frac{V_3(t)}{V_\pi}},$$

where $V_\pi$ is the drive voltage required to cause a phase shift of $\pi$. The drive voltage $V_3(t)$ corresponds to 292 in FIG. 5c or 307 in FIG. 5d. In FIG. 6g, a graph line 310$_g$ is the magnitude of the phase modulator transfer characteristic, which shows that the phase modulator does not modulate the magnitude of the optical electric field. In FIG. 6h, a graph line 310$_h$ is the phase of the phase modulator transfer characteristic, which shows that $E_{out}(t)$ is subject to a phase shift that is linearly proportional to $V_3(t)$. In particular, a step change of $V_\pi$ in $V_3(t)$ induces a n phase shift in $E_{out}(t)$, i.e., changes the sign of $E_{out}(t)$.

In order to illustrate the operation of the present invention, we consider the example of a preferred embodiment that uses the encoder 182, which is shown in FIG. 4b, in conjunction with the modulation subsystem 26a, which is based on a dual-drive, push-pull, Mach-Zehnder interferometric intensity modulator, and is shown in FIG. 5a. This embodiment can use any of the three receiver embodiments that are shown in FIGS. 3a, 3b and 3c, including the direct-detection receiver 20a, the asynchronous homodyne receiver 20b, or the asynchronous heterodyne receiver 20c. The design of the encoder 182 has been described in detail above. Recall that the encoder 182 is designed assuming k=2 and M=$2^k$=4. Recall also that within the encoder 182, the subsequence encoder 151a (specifically, the subsequence decomposer 153a within 151a) is designed with reference to the mapping between blocks of 2 information bits ($X_1$, $X_2$) and 4-ary pulse-amplitude modulation symbols $D_m$ that is shown in the table 1, above, although the subsequence encoder 151a does not actually generate the sequence $D_m$. In the present example, we further assume that in 182, the amplifiers 210, 211 and 212 have gains $G_1$=0.59, $G_2$=0.91 and $G_3$=1.50, respectively. Note that this embodiment implements Gray coding, in view of the mapping assumed in the design of 151a, the choice of monotonically increasing gains for amplifiers 210, 211 and 212 (i.e., $G_3 > G_2 > G_1$), and the monotonic characteristics of the modulation subsystem 26a.

The duobinary precoded pulse-amplitude modulation symbol sequence $B_m$, denoted by 177a, takes on the 2M−1=7 levels indicated in a table 2, below. We assume that in the modulation subsystem 26a, the driver amplifiers 262 and 263 have gains G and −G, respectively, where G=$V_\pi$/6, so that the signal $V_1(t)$, denoted by 264, takes on the values shown in the table 2. We assume that the transmitted optical electric field $E_{trans}(t)$, denoted by 34a, has a peak value of $\sqrt{3}$, corresponding to a peak intensity of 3, so that the transmitted optical electric field 34a takes on the values shown in the table 2. Finally, we assume that the receiver, whether it be 20a, 20b, or 20c, has gain such that the signal v(t), denoted by 43, has a peak value of 3, so that the signal 43 takes on the values shown in a table 2, below. In order to simplify this example, we have assumed that the signal v(t) (43) is subject to negligible noise and/or intersymbol interference.

TABLE 2

| $B_m$ | $V_1(t)$ | $E_{trans}(t)$ | v(t) |
|---|---|---|---|
| −3.00 | −0.50$V_\pi$ | −$\sqrt{3}$ | 3 |
| −1.82 | −0.30$V_\pi$ | −$\sqrt{2}$ | 2 |
| −1.18 | −0.20$V_\pi$ | −1 | 1 |
| 0 | 0 | 0 | 0 |
| 1.18 | 0.20$V_\pi$ | 1 | 1 |

TABLE 2-continued

| $B_m$ | $V_1(t)$ | $E_{trans}(t)$ | v(t) |
|---|---|---|---|
| 1.82 | 0.30$V_\pi$ | $\sqrt{2}$ | 2 |
| 3.00 | 0.50$V_\pi$ | $\sqrt{3}$ | 3 |

FIGS. 7a–7p display waveforms of electrical and optical signals based upon an exemplary sequence shown in FIG. 7a for the information bit sequence 21. In these figures, the time axis is measured in units of the symbol interval T. Note that since k=2 in this example, the duration of each information bit is T/2. FIG. 7a shows the information bit sequence 21 to be conveyed. FIG. 7b shows the corresponding 4-ary pulse-amplitude modulation symbol sequence 154 ($D_m$) based on the mapping between blocks of 2 information bits shown in FIG. 7a and 4-ary pulse-amplitude modulation symbols assumed in the design of the subsequence encoder 151a within 182. Although the symbol sequence 154 is not actually generated within the subsequence encoder 151a, it is useful to view 154 to understand operation of the present embodiment. FIGS. 7c, 7d and 7e show the complemented logical subsequences $\bar{S}_{m,1}$, $\bar{S}_{m,2}$ and $\bar{S}_{m,3}$, denoted by 190, 191 and 192, respectively. Note that during any given symbol interval, at most one of the subsequences 190, 191 and 192 takes on a logical 0. FIGS. 7f, 7g and 7h show the bipolar precoded subsequences 203 ($I_{m,1}$), 204 ($I_{m,2}$) and 205 ($I_{m,3}$), respectively. FIGS. 7i, 7j and 7k show the duobinary precoded subsequences 206 ($B_{m,1}$), 207 ($B_{m,2}$) and 208 ($B_{m,3}$), respectively. Note that during any given symbol interval, at most one of the duobinary precoded subsequences 206, 207 and 208 takes on a nonzero level. FIG. 7l shows the duobinary, precoded symbol sequence B. denoted by 177a. FIG. 7m shows the intensity modulator drive signal $V_1(t)$ denoted by 264. FIG. 7n shows the transmitted optical electric field $E_{trans}(t)$ denoted by 34a. FIG. 7o shows the 4-ary pulse-amplitude modulation signal v(t) 43 at the receiver, whether the receiver embodiment is 20a, 20b, or 20c. Note that, during a sequence of symbol intervals, the 4-ary pulse-amplitude modulation signal v(t), denoted by 43, takes on a sequence of levels corresponding to those of the transmitted 4-ary pulse-amplitude modulation symbol sequence $D_m$, denoted by 154. This implies that it should be possible for a receiver to perform 4-ary symbol-by-symbol decisions on 43 to recover the transmitted information bits, without the potential for error propagation. In the receivers 20a, 20b, or 20c, the 4-ary pulse-amplitude modulation decision device 44 samples v(t), denoted by 43, at approximately the midpoint of each symbol interval and compares each sample to a set of 3 thresholds to make symbol-by-symbol 4-ary decisions. In FIG. 7o, circles 320 denote these samples, while dashed lines 321a, 321b and 321c denote the 3 thresholds employed by the decision device 44. FIG. 7p shows the recovered information bits 50 at the receiver 20a, 20b, or 20c.

We consider another example of a preferred embodiment of the present invention, which uses the encoder 182, which is shown in FIG. 4b, in conjunction with the modulation subsystem 26b, which is based on a single-drive, push-pull, Mach-Zehnder interferometric intensity modulator, and is shown in FIG. 5b. As in the previous example, this embodiment can use any of the three receiver embodiments that are shown in FIGS. 3a, 3b and 3c, including the direct-detection receiver 20a, the asynchronous homodyne receiver 20b, or the asynchronous heterodyne receiver 20c. We assume that the encoder 182 operates precisely as in the previous example. In this example, we assume that in the modulation subsystem 26b, the driver amplifier 272 has gain G=$V_\pi$/3 (twice the value in the previous example), and that the transmitted optical electric field $E_{trans}(t)$ denoted by 34b, has a peak value of √3 (as in the previous embodiment). Finally, we assume that the receiver, whether it be 20a, 20b, or 20c, has gain such that the signal v(t), denoted by 43, has a peak value of 3, as in the previous example. In the present embodiment, all of the electrical and optical signal waveforms are identical to those shown in FIGS. 7a–7p, except that in the present embodiment, values of the signal $V_1(t)$, denoted by 273 in FIG. 5b, are twice as large as those indicated by 264 in FIG. 7m. That is to say, in this embodiment, $V_1(t)$ takes on values between $-V_\pi$ and $V_\pi$.

We will now discuss two alternate embodiments of duobinary M-ary pulse-amplitude modulation signal encoders of the present invention. These alternate encoder embodiments are similar, in many respects, to the embodiments 150 and 182, respectively. In both alternate encoder embodiments, we encode the information bits to be transmitted in a set of M−1 precoded subsequences, form a weighted sum of the precoded subsequences, and lowpass filter the weighted sum. However, both alternate encoder embodiments omit the M−1 duobinary filters 165 that are included in 150 and 182. As we will see, these two encoder embodiments are used in combination with an alternate embodiment of a modulation subsystem that incorporates a duobinary filter. The combination of either encoder embodiment with this modulation subsystem encodes duobinary M-ary pulse-amplitude-modulated signals and modulates them onto a transmitted optical electric field. We will first consider an alternate encoder embodiment in which we encode the information bits to be transmitted in a M-ary pulse-amplitude modulation symbol sequence as an intermediate step, prior to forming the M−1 precoded subsequences. We will then consider an alternate encoder embodiment in which we avoid performing this intermediate step.

FIG. 8a is a block diagram of an alternate embodiment of a duobinary M-ary pulse-amplitude modulation signal encoder of the present invention, and is referred to by a general reference number 322. The encoder 322 is similar in many respects to the encoder 150, shown in FIG. 4a, except that 322 omits the set of M−1 duobinary filters that are present in 150. The initial part of the description of 322 is identical to the corresponding part of the description of 150. Information bits 21 to be transmitted, if in serial form, are passed to the serial-to-parallel converter 22, which forms parallel blocks of k bits, denoted by 23. Alternatively, if information bits are already in the form of parallel blocks 23, the serial-to-parallel converter 22 may be omitted. Blocks of k information bits 23 are input to the pulse-amplitude modulation signal encoder 24, which corresponds to 24 in FIG. 2. The encoder 24 includes the subsequence encoder 151, as well as some additional elements. The subsequence encoder 151 includes the M-ary pulse-amplitude modulation symbol encoder 152 and the subsequence decomposer 153. The blocks of k information bits 23 enter the M-ary pulse-amplitude modulation symbol encoder 152, which encodes each block of k information bits into a pulse-amplitude modulation symbol taking on one of M levels $D^{(0)}, \ldots, D^{(M-1)}$, where M≧2. The number of levels, M, must satisfy M≧$2^k$, with M=$2^k$ being encountered most often in practice. Below, we will explain how to design 152 to implement Gray coding. The output of 152 is the M-ary pulse-amplitude modulation symbol sequence $D_m$, denoted by 154. In the sequence 154, each symbol has interval T, and m is a time index counting symbol intervals.

The M-ary pulse-amplitude modulation symbol sequence 154 is input to the subsequence decomposer 153, which forms a set of M−1 logical subsequences, $S_{m,1}$ (denoted by 155a) through $S_{m,M-1}$ (denoted by 155b). Each of the logical subsequences is a binary sequence having symbol interval T, and each is associated with one of the M−1 levels $D^{(1)}$ through $D^{(m-1)}$. Note that there is no subsequence associated with the level $D^{(0)}$. During each symbol interval, a given logical subsequence takes on a logical 0 unless the M-ary pulse-amplitude modulation symbol sequence takes on the corresponding level, in which case, that subsequence takes on a logical 1. To describe these logical subsequences mathematically: during the mth symbol interval, for i=1, . . . ,M−1, $S_{m,i}$=1 if $D_m=D^{(i)}$ and $S_{m,i}$=0 if $D_m \neq D^{(i)}$. Note that during a given symbol interval, at most one of the logical subsequences takes on a logical 1. The subsequences 155a through 155b comprise the outputs of the subsequence encoder 151.

The subsequences 155a through 155b are input to a subsequence composer 323, which includes several elements, as described below. Inside of 323, the M−1 logical subsequences 155a through 155b are received by the M−1 logical subsequence precoders, respectively, each of which is denoted by 157. Each precoder 157 includes the exclusive-OR gate 158 having an inverter on one input, as well as the one-symbol delay 159, interconnected in a feedback arrangement. The outputs of these M−1 logical subsequence precoders 157 are the logical precoded subsequences $P_{m,1}$ (denoted by 160) through $P_{m,M-1}$ (denoted by 161), respectively. These logical precoded subsequences 160 through 161 are related to the logical subsequences 155a through 155b, respectively, by the rule that, during the mth symbol interval, for i=1, . . . ,M−1, $P_{m,i} = \overline{S}_{m,i} - P_{m-1,i} \pmod{2}$, where $\overline{S}_{m,i}$ is the complement of the ith logical subsequence $S_{m,i}$ in the mth symbol interval, and where $P_{m-1,i}$ is the ith logical precoded subsequence during the previous symbol interval, m−1. The precoding performed by the precoders 157 makes it possible for a receiver to recover the information bits by making M-ary symbol-by-symbol decisions on a signal proportional to the received optical intensity, without the potential for error propagation. While we have described here an implementation of the precoders 157 based on exclusive-OR gates 158, it is possible to implement equivalent precoders using other logical gates to perform the function of "comparing" delayed copies of 160 through 161 to 155a through 155b, respectively.

The logical precoded subsequences 160 through 161 pass to the M−1 level shifters 162, labeled "L/S", respectively. Each of the level shifters 162 converts a logical input. signal (taking on levels corresponding to logical 0 or logical 1, respectively) to a bipolar input signal (taking on equal and opposite levels, e.g., −1or 1, respectively). In a practical embodiment of the invention, the level shifters 162 may simply correspond to an a.c.-coupling device, e.g., coupling capacitor. The respective outputs of the M−1 level shifters 162 are the bipolar precoded subsequences $I_{m,1}$ (denoted by 163) through $I_{m,M-1}$ (denoted by 164). These bipolar precoded subsequences 163 through 164 are related to the logical precoded subsequences 160 through 161, respectively, according to the rule that, during the mth symbol interval, for i=1, . . . ,M−1, $I_{m,i}$=1 if $P_{m,i}$=1 and $I_{m,i}$=1 if $P_{m,i}$=0.

Note that up to this point, the description of the encoder 322 has been identical to the corresponding part of the description of the encoder 150.

The encoder 322 incorporates a set of M−1 amplifiers, denoted by 324a through 324b, having respective gains $G$. through $G_{M-1}$, respectively. Each of the bipolar precoded subsequences 163 through 164 is respectively weighted by one of the amplifiers 324a through 324b, resulting in M−1 signals denoted 325 through 326, respectively. The M−1 signals 325 through 326 are input to a summer 327, whose output is a precoded pulse-amplitude modulation symbol sequence $I_m$, denoted by 330. The sequence 330 is a weighted sum of the sequences 163 through 164, i.e., $$I_m = \sum_{i=1}^{M-1} G_i I_{m,i}.$$

Note that the sequence 330 takes on up to $2^{M-1}$ levels, depending on the choice of the gains of 324a through 324b. The sequence 330 passes into a lowpass filter 331, whose output is a precoded pulse-amplitude modulation signal w(t), denoted by 332. Although in the embodiment 322 we show the lowpass filter 331 as a separate component, in some embodiments, the lowpass filter may not be present as a separate component, and the lowpass filtering function may be performed by one or more other components in the duobinary M-ary pulse-amplitude modulation signal encoder or in the modulation subsystem that follows it.

Since the lowpass filter 331 is a linear system, the levels taken on by the signal 332 are proportional to the levels taken on by the sequence 330. In practice, the choice of the gains of amplifiers 324a through 324b, which determine the levels that are to be taken on by the sequence 330, and thus by the signal 332, depends on the characteristics of the modulation subsystem used to modulate the signal 332 onto the optical carrier electric field 29 to produce the transmitted optical electric field 34, and also depends on the set of levels that are to be taken on by the transmitted optical electric field 34, and thus the transmitted optical intensity $I_{trans}(t)$.

In some cases, it may be desirable to design the encoder 322 to use Gray coding, i.e., so that blocks of k information bits 23 encoded into symbols corresponding to adjacent levels in the transmitted optical intensity $I_{trans}(t)$ differ by only one information bit. As we will see, the encoder 322 is to be used with a modulation subsystem in which the transmitted electric field 34 is a monotonic function of the encoded pulse-amplitude modulation signal 25, which corresponds to 332 in the present embodiment. Suppose that we choose $G_1$ through $G_{M-1}$, the gains of amplifiers 324a through 324b, to be monotonically increasing (i.e., $G_{M-1} > \ldots > G_1$). In this case, to implement Gray coding, we should design the encoder 152 so that blocks of k information bits 23 encoded into adjacent levels (e.g., $D^{(i)}$ and $D^{(i+1)}$) differ by only one information bit.

We now consider an alternate encoder embodiment of a duobinary M-ary pulse-amplitude modulation signal encoder in which we encode the information bits to be transmitted in a set of M−1 precoded subsequences, without performing the intermediate step of encoding the information bits in a M-ary pulse-amplitude modulation symbol sequence. We consider a specific example in which k=2 and $M=2^k=4$. FIG. 8b is a block diagram of an alternate embodiment of a duobinary 4-ary pulse-amplitude modulation signal encoder of the present invention, and is referred to by a general reference number 335. The encoder 335 is similar in many respects to the encoder 182, shown in FIG. 4b, except that 335 omits the set of M−1=3 duobinary filters that are present in 182. The initial part of the description of 335 is identical to the corresponding part of the description of 182. Information bits 21 to be transmitted, if in serial form, are passed to the serial-to-parallel converter 22, which forms parallel blocks of 2 bits $X_1$ and $X_2$, which are denoted by 183 and 184, respectively. Alternatively, if information bits are already in the form of parallel blocks of 2 bits, then the serial-to-parallel converter 22 may be omitted. Blocks of 2 information bits 183 and 184 are input to the pulse-amplitude modulation signal encoder 24, which corresponds to 24 in FIG. 2. The encoder 24 includes the subsequence encoder 151a, as well as some additional elements. The subsequence encoder 151a implements the same functions in the specific embodiment 335 as the subsequence encoder 151 implements in the more general embodiment 322. In other words, 151a encodes blocks of k=2 information bits in a set of M−1=3 logical precoded subsequences. However, unlike 151, 151a avoids the intermediate step of encoding the information bits in a 4-ary pulse-amplitude modulation symbol sequence. The subsequence encoder 151a includes the subsequence decomposer 153a.

Although the subsequence encoder 151a avoids the intermediate step of encoding the information bits in a 4-ary pulse-amplitude modulation symbol sequence, 151a (more specifically, the subsequence decomposer 153a within 151a) is designed with reference to a specific mapping between blocks of 2 information bits and 4-ary pulse-amplitude modulation symbols, which is shown in a table 3, below.

TABLE 3

| $X_1$ | $X_2$ | $D_m$ | $\overline{S}_{m,1}$ | $\overline{S}_{m,2}$ | $\overline{S}_{m,3}$ |
|---|---|---|---|---|---|
| 0 | 0 | 0 | 1 | 1 | 1 |
| 0 | 1 | 1 | 0 | 1 | 1 |
| 1 | 1 | 2 | 1 | 0 | 1 |
| 1 | 0 | 3 | 1 | 1 | 0 |

As we will see, this specific mapping implements Gray coding if we properly design some additional elements within the encoder 335 and the modulation subsystemh 26. The subsequence decomposer 153a needs to form the logical subsequences $S_{m,1}$, $S_{m,2}$ and $S_{m,3}$, which take on a logical 1 when $D_m=1$, 2, and 3, respectively, and take on a logical 0 otherwise. Equivalently, 153a can form the complemented logical subsequences $S_{m,1}$, $S_{m,2}$ and $S_{m,3}$, which are related to the information bits $X_1$ and $X_2$ as indicated in the table 3, above. The subsequence decomposer 153a includes three OR gates, denoted by 186, 187 and 188 having appropriate inverters on the inputs which generate the complemented logical subsequences $\overline{S}_{m,1}$, $\overline{S}_{m,2}$ and $\overline{S}_{m,3}$, which are denoted by 190, 191 and 192, respectively. The subsequences 190, 191 and 192 comprise the outputs of the subsequence encoder 151a.

The subsequences 190, 191 and 192 are input to a subsequence composer 323a, which includes several elements, as described below. Inside of 323a, the subsequences 190, 191 and 192 are received by respective ones of three precoders 193. Each of the precoders 193 includes the exclusive-OR gate 195 and the one-symbol delay 196, interconnected in a feedback arrangement. The outputs of the three precoders 193 are the logical precoded subsequences $P_{m,1}$, $P_{m,2}$ and $P_{m,3}$, which are denoted by 200, 201 and 202, respectively. The logical precoded subsequences 200, 201 and 202 are related to the complemented logical subsequences 190, 191 and 192, respectively, by the rule that, during the mth symbol interval, for i=1,2,3, $P_{m,i} = \overline{S}_{m,i} - P_{m-1,i}$ (mod 2). While we have described here an implementation of the precoders 193 based on the exclusive-OR gates 195, it is possible to implement equivalent precoders using other logical gates to perform the function of "comparing" delayed copies of the logical precoded subsequences 200, 201 and 202 to the complemented logical subsequences 190, 191 and 192, respectively.

The remaining portion of the encoder 335 is analogous to the corresponding portion of the encoder 322 (note, however, that the encoder 322 is for arbitrary M≧2, whereas encoder 335 is specifically for M=4). The logical precoded subsequences 200, 201 and 202 are received by three level shifters, respectively, each of which is labeled "L/S" and denoted by 162. The outputs of the three level shifters 162 are the bipolar precoded subsequences $I_{m,1}$, $I_{m,2}$, and $I_{m,3}$, which are denoted by 203, 204 and 205, respectively. The bipolar precoded subsequences 203, 204 and 205 are related to the logical precoded subsequences 200, 201 and 202, respectively, by the rule that, during the mth symbol interval, for i=1,2,3, $I_{m,i}$=1 if $P_{m,i}$=1 and $I_{m,i}$=−1 if $P_{m,i}$=0.

Note that up to this point, the description of the encoder 335 has been identical to the corresponding part of the description of encoder 182.

The encoder 335 incorporates a set of three amplifiers 336, 337 and 338 having gains $G_1$, $G_2$ and $G_3$, respectively. The outputs of the amplifiers 336, 337 and 338 are scaled subsequences 340, 341 and 342, respectively. The scaled subsequences 340, 341 and 342 are input to the summer 327, whose output is a precoded pulse-amplitude modulation symbol sequence $I_m = G_1 I_{m,1} + G_2 I_{m,2} + G_3 I_{m,3}$, denoted by 330a. Note that the sequence 330a takes on up to $2^{M-1}$=8 levels, depending on the choice of the gains of 336, 337 and 338. The sequence 330a passes into the lowpass filter 331, whose output is a precoded pulse-amplitude modulation signal w(t), denoted by 332a. Although in the embodiment 335 we show the lowpass filter 331 as a separate component, in some embodiments, the lowpass filter may not be present as a separate component, and the lowpass filtering function may be performed by one or more other components in the duobinary M-ary pulse-amplitude modulation signal encoder or in the modulation subsystem that follows it.

Since the lowpass filter 331 is a linear system, the levels taken on by the signal 332a are proportional to the levels taken on by the sequence 330a. In practice, the choice of the gains of the amplifiers 336, 337 and 338, which determine the levels that are to be taken on by the sequence 330a, and thus by the signal 332a, depends on the characteristics of the modulation subsystem used to modulate the signal 332a onto the optical carrier electric field 29 to produce the transmitted optical electric field 34, and also depends on the set of levels that are to be taken on by the transmitted optical electric field 34, and thus the transmitted optical intensity $I_{trans}(t)$.

In some cases, it may be desirable to design the encoder 335 to use Gray coding, i.e., so that blocks of 2 information bits 183 and 184 encoded into symbols corresponding to adjacent levels in the transmitted optical intensity $I_{trans}(t)$ differ by only one information bit. As we will see, the encoder 335 is to be used with a modulation subsystem in which the transmitted electric field 34 is a monotonic function of the encoded pulse-amplitude modulation signal 25, which corresponds to 332a in the present embodiment. Suppose that we choose $G_1$, $G_2$ and $G_3$, the gains of the amplifiers 336, 337 and 338, to be monotonically increasing (i.e., $G_3 > G_2 > G_1$). In this case, the specific mapping between blocks of 2 information bits and 4-ary pulse-amplitude modulation symbols assumed in the design of 151a implements Gray coding. In other words, blocks of 2 information bits encoded into adjacent levels in the transmitted optical intensity $I_{trans}(t)$ differ by only one information bit.

The encoders 322 and 335 are to be used in conjunction with the modulation subsystem shown in FIG. 9, which is given a general reference number 26e. The modulation subsystem 26e is very similar to the modulation subsystem 26a using a dual-drive intensity modulator, which is shown in FIG. 5a, except that in 26e, the drive signal to one arm of the modulator is delayed by one symbol interval. The modulation subsystem 26e includes an optical signal generator 27e and a signal generator driver 32e. Within 27e, a laser or other light source, designated 28, generates an unmodulated optical carrier described by the optical carrier electric field $E_{carrier}(t)$, denoted by 29. The optical carrier electric field 29 is passed into a dual-drive, push-pull, Mach-Zehnder interferometric intensity modulator 346. Within 32e, the precoded pulse-amplitude modulation signal w(t), denoted by 332, 332a, is passed into an amplifier 347 having gain G, whose output is a modulator drive signal $V_1(t) = Gw(t)$, denoted by 348. The signal 332, 332a is also passed to a one-symbol delay 349, and a delayed signal 350 is passed to a driver amplifier 351 having gain −G, whose output is a delayed complementary modulator drive signal $V_2(t) = -Gw(t-T)$, denoted by 352. The drive signals 348 and 352 are input to the modulator 346, whose output is a transmitted optical electric field $E_{trans}(t)$, denoted by 34e. The modulator 346 is biased by a d.c. bias $V_b$, denoted by 353, which is chosen so that transmitted optical electric field 34e is approximately zero when the signals $V_1(t)$ and $V_2(t)$ are zero.

Since the modulator 346 is driven by the signal 348 and the delayed complementary signal 352, the modulation subsystem 26e implements the function of duobinary filtering that is not present in the encoders 322 and 335. Considering the general case M≧2, a transmitter that combines the encoder 322 and the modulation subsystem 26e can thus generate duobinary M-ary pulse-amplitude-modulated optical signals (i.e., in the form of the transmitted optical electric field 34e) that are equivalent to 34a (generated by the encoder 150 combined with the modulation subsystem 26a), 34b (generated by the encoder 150 combined with the modulation subsystem 26b), 34c (generated by the encoder 150 combined with the modulation subsystem 26c), or 34d (generated by the encoder 150 combined with the modulation subsystem 26d). Considering the specific case M=4, a transmitter that combines the encoder 335 and the modulation subsystem 26e can thus generate duobinary 4-ary pulse-amplitude-modulated optical signals (i.e., in the form of the transmitted optical electric field 34e) that are equivalent to 34a (generated by the encoder 182 combined with the modulation subsystem 26a), 34b (generated by the encoder 182 combined with the modulation subsystem 26b), 34c (generated by the encoder 182 combined with the modulation subsystem 26c), or 34d (generated by the encoder 182 combined with the modulation subsystem 26d). In particular, in both the general case M≧2 and the specific case M=4, the transmitted optical electric field 34e exhibits all of the benefits of a narrowed optical spectrum and lengthened symbol interval that are exhibited by 34a, 34b, 34c and 34d. Also, after transmission through an optical transmission medium 19, the transmitted optical electric field 34e can be received by any of the three receiver embodiments 20a, 20b, or 20c, like 34a, 34b, 34c and 34d.

The present invention enables information bits to be transmitted via optical signals having a narrowed optical spectrum and lengthened symbol interval, yielding numerous benefits in practical communication systems.

In the present invention, the optical spectrum of the transmitted optical electric field 34 (or 34a–34e) depends on several factors, including the information bit rate, the number of levels in the transmitted optical electric field (2M−1), the precise choice of those levels, and the choice of encoder (150, 182, 322 or 335), the design of the lowpass filter (180 or 331), and the choice of modulation subsystem (26a, 26b, 26c, 26d or 26e). Nonetheless, for a given information bit rate, for all of the embodiments of duobinary M-ary pulse-amplitude modulation under the present invention, the optical spectrum is narrowed by a factor of approximately 2 as compared to M-ary pulse-amplitude modulation, by a factor of approximately $\log_2 M$ as compared to duobinary 2-ary pulse-amplitude modulation, and by a factor of approximately $2\log_2 M$ as compared to 2-ary pulse-amplitude modulation (on-off keying).

In order to illustrate the spectral narrowing achieved by the present invention, FIG. 10 compares the optical spectrum of the transmitted electric field for four different modulation schemes, and is given the general reference number 410. In 410, we assume an information bit rate of 40 Gbps for all four schemes. Note that for all four schemes, the optical spectrum is symmetric about the carrier frequency, so it is only necessary to show frequencies above the carrier frequency in 410. A spectrum illustration 411 represents the optical spectrum for 2-ary pulse-amplitude modulation (on-off keying) using non-return-to-zero pulses. A spectrum illustration 412 represents the optical spectrum for 4-ary pulse-amplitude modulation using non-return-to-zero pulses; we observe that the spectrum illustration 412 is a factor of 2 narrower than the spectrum illustration 411, as is well known. A spectrum illustration 413 represents the optical spectrum for duobinary 2-ary pulse-amplitude modulation; we see that the spectrum illustration 413 is also a factor of 2 narrower than the spectrum illustration 411, as is also well known. Finally, a spectrum illustration 414 represents the optical spectrum for duobinary 4-ary pulse-amplitude modulation following the present invention. We observe that the spectrum illustration 414 is a factor of 2 narrower than either the spectrum illustrations 412 or 413, and is a factor of 4 narrower than the spectrum illustration 411. In plotting 410, we have omitted impulses that appear at the carrier frequency (i.e. at the origin of 410) in the spectrum illustrations 411 and 412, and we have assumed equal optical power for all four modulation schemes, including these impulses. In plotting the spectrum illustration 414, we have assumed that the transmitted optical electric field takes on 7 equally spaced levels, e.g., $\{-3, -2, -1, 0, 1, 2, 3\}$. Modifying the choice of levels to a degree acceptable in practice would only slightly alter the optical spectrum shown in the spectrum illustration 414. In plotting 410, for all four schemes, we have assumed that the transmitter has a very wide bandwidth, so that the transmitted optical signal uses ideal rectangular pulses. In the case of duobinary 4-ary pulse-amplitude modulation following the present invention, this assumption means that the lowpass filter inside 24 has very wide bandwidth. For all four schemes, narrowing the bandwidth of the lowpass filter to a degree acceptable in practice would modify the optical spectra illustrated by 411, 412, 413 and 414 by diminishing the higher-frequency spectral sidelobes, but would not significantly alter our conclusions about the spectral narrowing provided by the present invention.

The narrowed spectrum shown in the spectrum illustration 414 yields several advantages in practice. In wavelength-division-multiplexed systems, which utilize some form of optical or electrical filters to select the desired signal at the receiver, the spacing between carrier frequencies can be reduced subject to some constraints on the tolerable distortion to the desired signal caused by these filters and the tolerable crosstalk from undesired signals not rejected by these filters, thereby increasing the spectral efficiency of the system. Also, the narrowed optical spectrum reduces pulse spreading caused by chromatic dispersion in systems using single-mode fiber as the transmission medium.

The transmitted optical electric field 34 (or 34a–34e) can be described as a duobinary M-ary pulse-amplitude-modulated optical signal, which can be described in terms of a sequence of encoded symbols, each having interval T. In the present invention, the symbol interval T is longer than the symbol interval in systems using 2-ary pulse-amplitude modulation (on-off keying) or duobinary 2-ary pulse-amplitude modulation by a factor $\log_2 M$, assuming $M=2^k$. For example, when M=4, the symbol interval is lengthened by a factor of 2.

This lengthened symbol interval yields several advantages in practice. The lengthened symbol interval improves a receiver's ability to recover the transmitted information bits in the presence of dispersion (i.e., pulse spreading) originating from several sources, including chromatic dispersion or polarization-mode dispersion in single-mode fiber, modal dispersion in multi-mode fiber, and multipath propagation in free-space links. The lengthened symbol interval also reduces the electrical bandwidth required of electrical-to-optical converters, optical-to-electrical converters and electrical components in the transmitter and receiver. Finally, the lengthened symbol interval reduces the clock speed required in the transmitter and receiver.

In practice, it may be attractive to implement optical communication systems using duobinary 4-ary pulse-amplitude modulation following the present invention. It is of interest to compare such systems to those using 2-ary pulse-amplitude modulation (on-off keying) with non-return-to-zero pulses, which is a modulation technique very widely employed in practice. The use of duobinary 4-ary pulse-amplitude modulation narrows the optical spectrum by approximately a factor of 4, and lengthens the symbol interval by a factor of 2. In dense wavelength-division-multiplexed systems, for a fixed per-channel information bit rate, the narrowed optical spectrum allows the spacing between carrier wavelengths to be reduced by approximately a factor of four, increasing the spectral efficiency of the system by approximately a factor of four.

In a system using single-mode fiber as the transmission medium, the narrowed spectrum and lengthened symbol interval approximately doubles the uncompensated chromatic dispersion that can be tolerated by the system. For example, in a system not using optical compensation of chromatic dispersion, this can permit a doubling of the chromatic-dispersion-limited transmission distance. Alternatively, if optical dispersion compensation is employed, with duobinary 4-ary pulse-amplitude modulation following the present invention, the fiber chromatic dispersion need not be compensated as accurately as it would need to be in a system using 2-ary pulse-amplitude modulation. Also, the lengthened symbol interval doubles the uncompensated polarization-mode dispersion that can be tolerated by the system; if the system does not use optical compensation of polarization-mode dispersion, this permits a quadrupling of the polarization-mode-dispersion-limited transmission distance.

Additionally, the lengthened symbol interval cuts approximately in half the electrical bandwidth required of electrical-to-optical converters, optical-to-electrical converters and electrical components in the transmitter and receiver. Finally, the lengthened symbol interval reduces the clock speed required in the transmitter and receiver by a factor of two.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An optical communication system, comprising:

a subsequence decomposer for decomposing compositions of input information bits into at least two input subsequences including a first of said input subsequences having a first level for a first of said compositions and a second level for all other said compositions, and a second of said input subsequences having said first level for a second of said compositions and said second level for all other said compositions;

a subsequence composer for composing an encoded pulse amplitude modulation (PAM) signal from differently weighted output subsequences derived from said input subsequences, respectively; and a modulation subsystem including a driver for converting said PAM signal into a modulation drive signal and an optical signal generator for responding to said drive signal by issuing an optical electric field having field levels including one or more positive said field levels and one or more negative said field levels, a first of said positive field levels and a first of said negative field levels having mirror-image redundant representations of said first of said compositions of said input information bits.

2. The system of claim 1, wherein:

said optical electric field includes two times an M minus one (2M−1) said field levels including an approximately zero level, said M minus one (M−1) said positive field levels, and said M minus one (M−1) said negative field levels in response to said M said compositions.

3. The system of claim 1, wherein:

said PAM signal includes two times an M minus one (2M−1) amplitudes in response to said M said compositions.

4. The system of claim 1, wherein:

the subsequence composer includes at least two precoders including a first of said precoders including a first logic device for comparing said first input subsequence to a first delayed subsequence for providing a first precoded subsequence and a second of said precoders including a second logic device for comparing said second input subsequence to a second delayed subsequence for providing a second precoded subsequence; and at least two precode delays including a first said precode delay for delaying said first precoded subsequence for providing said first delayed subsequence and a second said precode delay for delaying said second precoded subsequence for providing said second delayed subsequence, said precoded subsequences used for deriving said output subsequences.

5. The system of claim 4, wherein:

the subsequence composer further includes at least two combiners for combining delayed ones of said precoded subsequences with said precoded subsequences, respectively, for providing said output subsequences.

6. The system of claim 4, wherein:

the subsequence composer further includes at least two level shifters for level shifting said precoded subsequences, said precoded subsequences having said shifted levels used for deriving said output subsequences.

7. The system of claim 1, wherein:

the subsequence composer includes scalers for scaling levels of said output subsequences with respective weighting factors; and a subsequence combiner for providing said PAM signal by combining said output subsequences having said scaled levels.

8. The system of claim 1, wherein:

said driver includes a splitter for splitting said PAM signal into first and second complementary components, one of said first and second complementary components delayed with respect to the other and one of said first and second complementary components inverted with respect to the other; and said optical signal generator includes a dual-drive modulator for receiving first and second complementary components of said drive signal, respectively, for providing said optical electric field.

9. The system of claim 1, wherein:

said driver includes a splitter for converting said PAM signal into first and second complementary components of said drive signal, respectively; and said optical signal generator includes a dual drive modulator for receiving said first and second complementary drive signal components for providing said optical electric field.

10. The system of claim 1, wherein:

said driver provides a modulation bias for biasing said optical signal generator for providing said optical electrical field at an approximately zero level for said field levels when said drive signal is a neutral amplitude.

11. The system of claim 1, wherein:

said driver includes a magnitude converter for converting said PAM signal into a magnitude component of said drive signal; and a sign converter for converting said PAM signal into a sign component of said drive signal, said sign component having a first amplitude and a second amplitude for said positive field field levels and said negative field levels, respectively; and said optical signal generator controls intensity of said optical electric field in response to said magnitude component and controls phase of said optical electric field in response to said sign component.

12. The system of claim 1, further comprising:

a receiver for receiving said optical electric field through an optical medium, extracting a received pulse-amplitude-modulation (PAM) signal from an intensity of said received optical electric field, and performing decisions on the received PAM signal for recovering output information bits indicative of said input information bits.

13. The system of claim 12, wherein:

the receiver uses direct detection for extracting said received PAM signal from said intensity of said received optical electric field.

14. The system of claim 12, wherein:

the receiver uses homodyne downconversion for extracting said received PAM signal from said intensity of said received optical electric field.

15. The system of claim 12, wherein:

the receiver uses heterodyne downconversion for extracting said received PAM signal from said intensity of said received optical electric field.

16. A method for transmitting an optical signal, comprising steps of:

decomposing compositions of input information bits into at least two input subsequences including a first of said input subsequences having a first level for a first of said compositions and a second level for all other said compositions, and a second of said input subsequences having said first level for a second of said compositions and said second level for all other said compositions;

composing an encoded pulse amplitude modulation (PAM) signal from differently weighted output subsequences derived from said input subsequences, respectively; and issuing an optical electric field in response to a modulation drive signal derived from said PAM signal, said optical electric field having field levels including one or more positive said field levels and one or more negative said field levels, a first of said positive field levels and a first of said negative field levels having mirror-image redundant representations of said first of said compositions of said input information bits in response to said drive signal.

17. The method of claim 16, wherein:

said optical electric field includes two times an M minus one (2M−1) said field levels including an approximately zero level, said M minus one (M−1) said positive field levels, and said M minus one (M−1) said negative field levels in response to said M said compositions.

18. The method of claim 16, wherein:

said PAM signal includes two times an M minus one (2M−1) amplitudes in response to said M said compositions.

19. The method of claim 16, further comprising steps of:

comparing said input subsequences to delayed subsequences, respectively, for providing precoded subsequences, respectively;

delaying said precoded subsequences for providing said delayed subsequences, respectively; and deriving said output subsequences from said precoded subsequences, respectively.

20. The method of claim 19, wherein:

the step of deriving said output subsequences from said precoded subsequences includes a step of combining delayed ones of said precoded subsequences with said precoded subsequences, respectively, for providing said output subsequences.

21. The method of claim 19, wherein:

the step of deriving said output subsequences from said precoded subsequences includes steps of level shifting said precoded subsequences; and deriving said output subsequences from said precoded subsequences having said shifted levels.

22. The method of claim 16, wherein:

the step of composing said PAM signal includes steps of scaling levels of said output subsequences with respective weighting factors; and combining said output subsequences having said scaled levels.

23. The method of claim 16, wherein:

the step of issuing said optical electric field includes steps of:

splitting said PAM signal into first and second components for said drive signal, one of said first and second components delayed with respect to the other and one of said first and second components inverted with respect to the other; and modulating an optical carrier signal with said first and second complementary components of said drive signal for providing said optical electric field.

24. The method of claim 16, wherein:

the step of issuing said optical electric field includes a step of converting said PAM signal into first and second complementary components for said drive signal; and modulating an optical carrier signal with said first and second complementary components for providing said optical electric field.

25. The method of claim 16, further comprising steps of:

the step of issuing said optical electric field includes steps of:

providing a modulation bias for centering said optical electrical field at an approximately zero level for said field levels when said drive signal is a neutral level; and modulating an optical carrier signal with said drive signal for providing said optical electric field.

26. The method of claim 16, wherein:

the step of issuing said optical electric field includes steps of:

converting said PAM signal into a magnitude component of said drive signal for controlling an intensity of said optical electric field; and converting said PAM signal into a sign component of said drive signal for controlling the sign of said optical electric field, said sign component having a first amplitude and a second amplitude for said positive field levels and said negative field levels, respectively.

27. The method of claim 16, further comprising steps of:

receiving said optical electric field through an optical medium;

extracting a received pulse-amplitude-modulation (PAM) signal from an intensity of said received optical electric field; and performing decisions on the received PAM signal for recovering output information bits indicative of said input information bits.

28. The method of claim 27, wherein:

the step of extracting said received PAM signal includes using direct detection of said received optical electric field.

29. The method of claim 27, wherein:

the step of extracting said received PAM signal includes using homodyne downconversion of said received optical electric field.

30. The method of claim 27, wherein:

the step of extracting said received PAM signal includes using heterodyne downconversion of said received optical electric field.

* * * * *